(12) United States Patent
Lyubomirsky

(10) Patent No.: US 8,098,996 B2
(45) Date of Patent: Jan. 17, 2012

(54) ADAPTABLE DUOBINARY GENERATING FILTERS, TRANSMITTERS, SYSTEMS AND METHODS

(75) Inventor: Ilya Lyubomirsky, Temecula, CA (US)

(73) Assignee: Infinera Corporation, Sunnyvale, CA (US)

( * ) Notice: Subject to any disclaimer, the term of this patent is extended or adjusted under 35 U.S.C. 154(b) by 1063 days.

(21) Appl. No.: 11/861,236

(22) Filed: Sep. 25, 2007

(65) Prior Publication Data

US 2009/0092396 A1 Apr. 9, 2009

(51) Int. Cl.
*H04B 10/04* (2006.01)
(52) U.S. Cl. .................. 398/183; 398/188; 398/195
(58) Field of Classification Search .......... 398/183–201
See application file for complete search history.

(56) References Cited

U.S. PATENT DOCUMENTS

| | | | |
|---|---|---|---|
| 6,388,786 B1 * | 5/2002 | Ono et al. ............. | 398/183 |
| 2002/0101639 A1 * | 8/2002 | Yano .................... | 359/181 |
| 2004/0252929 A1 * | 12/2004 | Kim et al. ............. | 385/1 |
| 2005/0265474 A1 * | 12/2005 | Chandrasekhar et al. | 375/291 |
| 2010/0166424 A1 * | 7/2010 | Nagarajan et al. ..... | 398/79 |

* cited by examiner

Primary Examiner — Dzung Tran

(74) Attorney, Agent, or Firm — Ross M. Carothers; David L. Soltz

(57) ABSTRACT

A variety of adaptable electronic duobinary generating filters to be used in communication systems are provided, each filter generating an adaptable electronic duobinay signal which is optimized for system impairments. According to one exemplary implementation, an adaptable electronic duobinary generating filter comprises an adaptable delay-and-add circuit, having an adaptable electronic delay element having a delay $\alpha T$: $1/T$ being the bit rate of the binary data input into the adaptable delay-and-add circuit, and $\alpha$ being an adaptation parameter which can be optimized depending on the system impairments. In one optional implementation, the adaptable electronic delay element can be programmably adaptable to optimize against deterministic system impairments. In another optional implementation, the adaptable electronic delay element can be dynamically adaptable to optimize against dynamically varying system impairments. Additionally, in one embodiment, an adaptable electronic duobinary drive circuitry based on the adaptable electronic duobinary generating filter can drive an adaptable optical duobinary transmitter in a fiber-optic communication system to produce an adaptable optical duobinary signal, where the adaptation parameter $\alpha$ is optimized to mitigate certain deleterious fiber-optic transmission system impairments, such as distortions due to narrow optical filtering. Corresponding optical duobinary systems and methods are provided. Similarly, the adaptable electronic duobinary generating filter can be used to form an adaptable electronic duobinary transmitter for an electronic duobinary communication system, to optimize the electronic duobinary signal generated.

29 Claims, 22 Drawing Sheets

US 8,098,996 B2

ADAPTABLE DUOBINARY GENERATING FILTERS, TRANSMITTERS, SYSTEMS AND METHODS

BACKGROUND OF THE INVENTION

1. Field of the Invention

The present invention relates to communication systems, and more specifically to duobinary transmitters including optical duobinary transmitters designed for fiber-optic communication systems. Further, the present invention relates to an apparatus and method for optimizing electrical and optical duobinary signals against corresponding system impairments.

2. Description of the Related Art

The optical duobinary modulation format has been attracting increasing attention in recent years due to its many advantages for achieving both high-speed and high spectral efficiency in dense wavelength division multiplexing (DWDM) fiber-optic communication systems. Duobinary modulation produces a relatively narrow signal spectrum, relaxing the bandwidth requirements on components such as optical modulators and DWDM filters, while enabling a narrower channel spacing [Gill et. al., "42.7-Gb/s Cost-Effective Duobinary Optical Transmitter Using a Commercial 10-Gb/s Mach-Zehnder Modulator With Optical Filtering," IEEE Phot. Tech. Lett., Vol. 17, No. 5, p. 917, April 2005].

For example, as compared to ON-OFF Keying (OOK) modulation, duobinary modulation requires approximately half the bandwidth, enabling an efficient transmission of twice the information per channel [Bigo et. al., "Multiterabit/s DWDM Terrestrial Transmission With Bandwidth-Limiting Optical Filtering," IEEE J. Sel. Top. Quant. Elect., Vol. 10, No. 2, p. 329, March/April 2004.]. FIG. 1A compares the measured optical signal spectra for several optical modulation formats at 10 Gb/s bit rate. Note the relatively narrow duobinary spectrum (generated using a low-pass filter (LPF) implementation of duobinary generating filter) compared with OOK and differential phase shift keying (DPSK). The narrow duobinary spectrum enables duobinary systems to achieve 80% spectral efficiency DWDM transmission, without suffering significant penalties due to crosstalk or distortion from narrow optical filtering, as would be the case for other formats such as OOK or DPSK [Bosco et. al., "Modulation Formats Suitable for Ultrahigh Spectral Efficient WDM Systems," IEEE J. Sel. Top. Quant. Elect., Vol. 10, No. 2, p. 321, March/April 2004.].

High-speed optical transmitters typically employ a Mach-Zehnder Modulator (MZM) for modulating an optical carrier wave with the electronic data. For both DPSK and Duobinary formats, the MZM is biased at a null, and driven between transmission maxima to enable phase modulation in DPSK, and a combination of phase/amplitude modulation in Duobinary [Winzer et. al., "Advanced Modulation Formats for High-Capacity Optical Transport Networks," J. Lightwave Tech., Vol. 24, No. 12, p. 4711, Dec. 2006]. However, the Duobinary MZM requires approximately half the bandwidth compared with a DPSK MZM, a major advantage for high-speed transmission systems. Since a DPSK MZM requires greater bandwidth, it is more difficult and generally more expensive to manufacture compared with a Duobinary MZM. Moreover, as the demand for higher bit rates increases, the MZM bandwidth must increase accordingly. At some futuristic bit rate (e.g. 160 Gb/s), a DPSK MZM may become impractical, while a duobinary MZM will still be practical, as it requires much less bandwidth.

A conventional optical duobinary transmitter is shown in FIG. 1B. The transmitter shown is based on a dual-drive MZM 100B, such as for example a Z-cut Lithium Niobate MZM driven in a push-pull arrangement. In the dual-drive MZM, the two modulator arms are driven by the same voltage amplitude but in opposite directions in a push-pull operation. It is also possible to use a single-drive MZM, such as an X-cut Lithium Niobate MZM, in which case only a single drive voltage signal is required to drive both arms of the MZM simultaneously. The dual-drive MZM shown in FIG. 1B has the advantage of a lower drive voltage requirement compared with the corresponding single-drive MZM. The optical transmitter includes a binary data source (BDS) 110, which in practice may be a high-speed electronic multiplexer (Mux) used to multiplex slower speed tributary data signals up to the system bit rate. The optical duobinary transmitter further includes a duobinary precoder 120, differential driver amplifier (DA) 150, and two identical electronic duobinary generating filters (Duob Filters) 130 and 140. A laser source (LS) 160 is included along with a duobinary MZM 170. Note the DA 150 has two complementary outputs, amplified binary data signals B and $\bar{B}$.

In operation, BDS 110 generates electronic binary DATA which is input to the precoder 120. The precoder outputs a differentially precoded binary DATA (P-DATA). Differential precoding (not to be confused with differential transmission line discussed below) is typically used to avoid error propagation at the receiver. The precoded binary P-DATA signal propagates along a differential transmission line 122 to the DA 150. The corresponding differential outputs of DA 150 include a first amplified precoded electronic binary signal, and a second precoded electronic binary signal; the second electronic binary signal being the logical inverse of the first electronic signal. Electronic signals and are typically binary non-return-to-zero (NRZ) AC-coupled data signals. Electronic signal is input into a first electronic duobinary filter 130, and electronic signal is input into a second identical electronic duobinary filter 140. The electronic duobinary filters 130 and 140 are typically based on either a delay-and-add filter (DAF) circuit with bit period delay or a low-pass filter (LPF) which approximates the action of DAF. Electronic duobinary filter 130 converts the 2-level binary signal B into a 3-level electronic duobinary signal, and electronic duobinary filter 140 similarly converts the 2-level binary signal into a 3-level electronic duobinary signal. The two complementary 3-level electronic duobinary signals and are applied to the two arms of the MZM, their amplitudes typically adjusted by DA to reach the proper voltage levels according to the required switching voltage of the MZM. Note that and carry the same duobinary data, but are complementary signals. Thus, thinking of duobinary as a 3-level format with symbols [+V, 0, −V], when swings high to +V, swings low to −V, however, when is 0, is also 0. A continuous wave light (CW) light source (LS) 160, such as a Distributed Feedback (DFB) semiconductor laser, outputs an optical carrier wave (OCW) having a wavelength $\lambda$. The duobinary MZM 170 modulates the OCW with the electronic duobinary signal, and outputs an optical duobinary signal O-DB.

An optical duobinary transmitter can also employ the single-drive MZM, shown in FIG. 1C. The single-drive MZM requires only a single electronic duobinary drive signal. However, a factor of 2 larger drive voltage is typically necessary in this case to drive the MZM between two transmission maxima to produce the optical duobinary modulation.

A schematic diagram for the conventional electronic DAF 100D, which can be used as the electronic duobinary generating filter with either a dual-drive or single-drive MZM, is shown in FIG. 1D. As shown, the DAF 100D includes an electronic splitter 182, a delay element 186, transmission lines 185, 187, 189, and a coupler or addition circuit 188. The propagation delay ΔT of transmission line 185 is nominally equal to the delay of transmission lines 187 and 189 combined. In conventional duobinary systems, the delay element 186 has a delay equal to a bit period T, where 1/T is the bit rate of the binary data signal B input to the electronic duobinary generating filter. Thus, delay element 186 outputs a delayed binary data signal B(ΔT+T) to the addition circuit 188, giving an additional delay of T to this signal.

In operation, an incoming binary data signal B, such as a precoded binary data signal, is split by the electronic splitter 182 into two paths along transmission lines 185 and 187. The signal on transmission line 185 propagates with a nominal delay ΔT to the addition circuit 188. The signal on transmission line 187 reaches the addition circuit 188 with a total cumulative delay ΔT+T, with the extra delay T obtained by transmission through delay element 186. Thus, the addition circuit 188 adds a binary data signal B(ΔT) with a delayed replica B(ΔT+T), where the delayed signal is delayed by a bit period T. In time domain, the DAF induces a correlation between adjacent bits. In frequency domain, the DAF may be viewed as a comb filter with a first null occurring at frequency ½ T. The process of passing a binary data signal B through DAF 100D produces a 3-level electronic duobinary signal having a spectrum compressed by a factor of 2 compared to the binary data signal B. For example, for a polar 2-level binary input data signal B with symbols [+V/2, −V/2], the duobinary filter 100D in FIG. 1D produces an 3-level signal with symbols [+V, 0, −V].

In fiber-optic communication systems, such as long-haul systems based on dense wavelength division multiplexing (DWDM), various deleterious effects of the channel can reduce the maximum transmission distance possible before the signals must be regenerated. In particular, deleterious channel effects include fiber chromatic dispersion, polarization mode dispersion, fiber nonlinearities, and distortion due to propagation through narrow optical DWDM filters, including possible distortions due to drift of a narrow optical filter off of a channel center frequency due to ambient temperature variation or other time varying environmental factors. The distortion due to narrow optical filters is particularly important in optical networks utilizing optical add/drop modules (OADM) that require DWDM de-multiplexing and multiplexing at each OADM node.

Yet, a flexible DWDM optical network requires the ability for individual wavelength channels to be added and/or dropped along the transmission line, which is typically accomplished with an OADM. Often, the architecture of an OADM requires that DWDM channels are first de-multiplexed, added/dropped, and then multiplexed again for transmission at each OADM node. This results in deleterious optical filtering imposed on the signals of each wavelength channel passed through the OADM, which can distort the signals, and cause performance degradation. Moreover, the amount of deleterious optical filtering imposed on a particular signal depends on the number of OADMs passed through by that signal. To mitigate these deleterious effects in optical DWDM networks typically requires an adaptable system. While optical duobinary systems are generally more tolerant to narrow optical filtering compared to other modulation formats due to their inherently narrow spectrum, eventually, transmission through multiple OADMs can also severely degrade the performance of a duobinary system, especially in high-spectral efficiency systems where the optical DWDM filter bandwidths approach the bitrate.

Different attempts have been made to generate improved optical duobinary signals that are more tolerant to various fiber-optic channel impairments. For example, to reduce the effect of chromatic dispersion in a fiber-optic communication system, Jae-Hoon Lee's patent application No. 2006/0072924 A1 (2006) teaches an optical transmitter based on converting an optical DPSK signal into a duobinary signal using an optical delay interferometer (DI), as shown in FIG. 2. According to Jae-Hoon Lee's scheme, a pre-coder 210 outputs a precoded binary signal 212 and a logically inverted precoded binary signal 214 into corresponding AMP 220 and AMP 230 respectively, to produce amplified signals 222 and 232. A laser light source 240 outputs a CW light 242, which DPSK MZM 250 modulates according to signals 222 and 232, to produce a modulated optical DPSK signal 252. Next, the modulated optical DPSK signal is input to an optical delay interferometer DI 300, having an optical splitter 260, an optical delay 270 and an optical coupler 280, to output an optical duobinary signal 282. The DI optical delay element has a delay in the range 0.5-0.8 of a bit period, with the delay set to improve chromatic dispersion tolerance. A similar scheme was proposed recently [Mikkelsen et. al., "Partial DPSK with Excellent Filter Tolerance and OSNR Sensitivity," IEE Elect. Lett., Vol. 42, No. 23, 2006], whereby an optical DPSK signal is first propagated through the fiber-optic system, including narrow optical filters, and the delay of an optical DI demodulator is adjusted at the receiver to reduce the penalty from narrow optical filtering.

Both of the above schemes rely on optical filtering techniques, in particular utilizing an optical DI, to optimize the duobinary or DPSK signals. Indeed, Lee teaches against the conventional duobinary transmitter design based on an electronic duobinary generating filter, arguing that potential deleterious effects in the electronic driver amplifier may distort the duobinary signal (p. 1, paragraph 8). To avoid such distortions, Lee proposes eliminating the electronic duobinary generating filter and instead first generating an optical DPSK signal, and then passing the generated optical DPSK signals through an optical DI to produce the optical duobinary signal. In this way, Lee proposed to avoid the stated signal degradation caused by electronic amplifiers.

Lee's approach has the following shortcomings which need to be solved:

(1) Lee's design requires an optical DPSK MZM since it first generates an optical DPSK signal. As noted above, a DPSK MZM requires a greater bandwidth compared to an optical duobinary MZM, which can be a serious limitation in high-speed systems, for example.

(2) Lee's DI circuit 300 for generating the optical duobinary signal, being an optical mechanism, is difficult to adjust dynamically in real time to adapt for dynamically changing channel conditions. For example, to adjust the optical delay in a DI, typically some mechanical mechanism is used to vary the optical path length, which may be a relatively slow and bulky mechanism.

(3) Lee's optical DI circuit 300, being an optical mechanism with multiple components, is expensive and difficult to fabricate. The optical DI may also require a heater and/or thermo-electric cooler (TEC), and stabilization feedback system to accurately control the optical delay, as well as the optical phase. A frequency drift of only a few percent relative to bit rate can result in significant performance penalty [see for example, H. Kim and P. Winzer, "Robustness to Laser Frequency Offset in Direct-Detection DPSK and DQPSK Systems," J. Lightwave Tech., Vol. 21, No. 9, p. 1887, September., 2003].

(4) Lee's optical DI circuit 300 is relatively large which makes it an unattractive optical element to be integrated into a Photonic Integrated Circuit (PIC), where space is limited and typically reserved for indispensable photonic elements. Integration of a DI circuit may unnecessarily substantially increase fabrication cost of a typical PIC transmitter.

Thus, there is still a need for an improved optical duobinary transmitter which is adaptable to compensate for deleterious system impairments, such as in DWDM systems having different numbers of OADMs along the transmission line. This transmitter should be capable of high-speed operation, while also being reliable, low cost, and dynamically adaptable to deleterious channel dynamics, such as the drift of a narrow optical filter off of a channel center frequency due to ambient temperature variation. Moreover, such an adaptable transmitter should be attractive for integration on a PIC.

In one aspect, the present invention provides an adaptable optical duobinary transmitter which can compensate for certain deleterious system impairments while overcoming the shortcomings of the prior art. Despite Lee's teaching away from an electronic duobinary generating filter, the present invention is based on an electronic duobinary generating filter providing at least the following advantages over the prior art:

(1) The present invention provides an adaptation mechanism for optimizing the electrical and/or optical duobinary signal to mitigate certain system impairments.

(2) According to one aspect of the present invention, an adaptable electronic duobinary signal is generated by an adaptable electronic duobinary filter, which allows for a narrower bandwidth optical duobinary modulator, such as a duobinary MZM, in the transmitter. As this invention allows for an optical duobinary modulator which requires less bandwidth compared with an optical DPSK MZM used by some prior art, this invention improves performance, especially in high-speed systems.

(3) According to another aspect of this invention, an adaptable electronic duobinary generating filter is provided which is relatively easier to adjust dynamically in real time in order to adapt for dynamically changing channel impairments.

(4) According to yet another aspect of this invention, the adaptable electronic generating filter is relatively inexpensive and easier to fabricate than an optical duobinary generating filter, such as the optical DI suggested by the prior art.

(5) According to an additional aspect of the present invention, an adaptable electronic mechanism is provided which can be more easily miniaturized compared with a multi component optical mechanism, such as the optical DI provided by Lee.

(6) According to yet another aspect of the present invention, an adaptable optical duobinary transmitter is provided which is attractive for photonic integration on a PIC.

These and other advantages related to this invention will become apparent and appreciated by referring to the following summary, description, and claims taken in conjunction with the accompanying drawings.

SUMMARY OF THE INVENTION

In accordance with some aspects of the present invention, an adaptable electronic duobinary generating filter is provided which can be adapted to optimize the generated duobinary signal. In one exemplary implementation, the adaptable electronic duobinary generating filter can be programmably adaptable to optimize against deterministic system impairments. In another exemplary implementation, the adaptable electronic duobinary generating filter can also be dynamically adaptable to optimize against dynamically varying system impairments.

According to some implementations, this novel adaptable electronic duobinary generating filter can be applied to be used in an adaptable electronic duobinary transmitter and in an adaptable optical duobinary transmitter.

Also, according to some implementations, a plurality of adaptable optical duobinary transmitters can be integrated, in part, on a Photonic Integrated Circuit (PIC). Also, whether integrated on a PIC or not, these adaptable optical duobinary transmitters can be utilized in a DWDM fiber-optic transmission system, according to some implementations.

According to one exemplary implementation of the adaptable electronic duobinary filter, an adaptable electronic duobinary generating filter is provided, comprising an adaptable delay-and-add circuit having a delay $\alpha T$, for receiving an incoming binary data having a bit rate $1/T$, and outputting an adaptable electronic duobinary signal, $\alpha$ being an adaptation parameter for optimizing the delay.

According to one implementation of the adaptable delay-and-add circuit, an adaptable delay element having the delay $\alpha T$, for receiving the incoming binary data and outputting a delayed binary data which is delayed by $\alpha T$, is provided with an adder for adding the incoming binary data with the delayed binary data and outputting the adaptable electronic duobinary data.

According to an implementation of the adaptable delay element, a programmable delay element is provided, by programming the adaptation parameter $\alpha$ to optimize the adaptable electronic duobinary signal for deterministic system impairments.

According to another implementation of the adaptable delay element, a dynamically adaptable delay element is provided for dynamically varying the adaptation parameter $\alpha$ to optimize the adaptable electronic duobinary signal for dynamically varying system impairments. According to a possible implementation, the dynamically adaptable delay element is controlled by a feedback control system for processing a feedback error signal and providing a feedback control signal to the adaptable delay circuit for dynamically optimizing the adaptation parameter $\alpha$ according to the feedback error signal. In one implementation of the feedback control system, the receiver provides the feedback error signal, for example based on the measured BER from FEC processing at the receiver.

These and other implementations, applications, aspects, methods, and a fuller understanding related to this invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Hereinafter, the embodiments of the present invention will be described with reference to the accompanying figures. For purposes of explanation rather than limitation, specific details are set forth such as the particular architecture, and techniques, etc., in order to provide a thorough understanding of the present invention. However, it will be apparent to those skilled in the art that the present invention may be practiced in other embodiments that depart from these specific details. Moreover, it will be recognized that certain aspects of the figures are simplified for explanation purposes and that the full system environment for the invention will include additional known functions and configurations all of which need not be shown here. Also, for purposes of clarity and simplicity, a detailed description of known functions and configurations incorporated herein will be omitted. In the following figures, similar reference symbols refer to like parts throughout the figures.

Figure 1A:
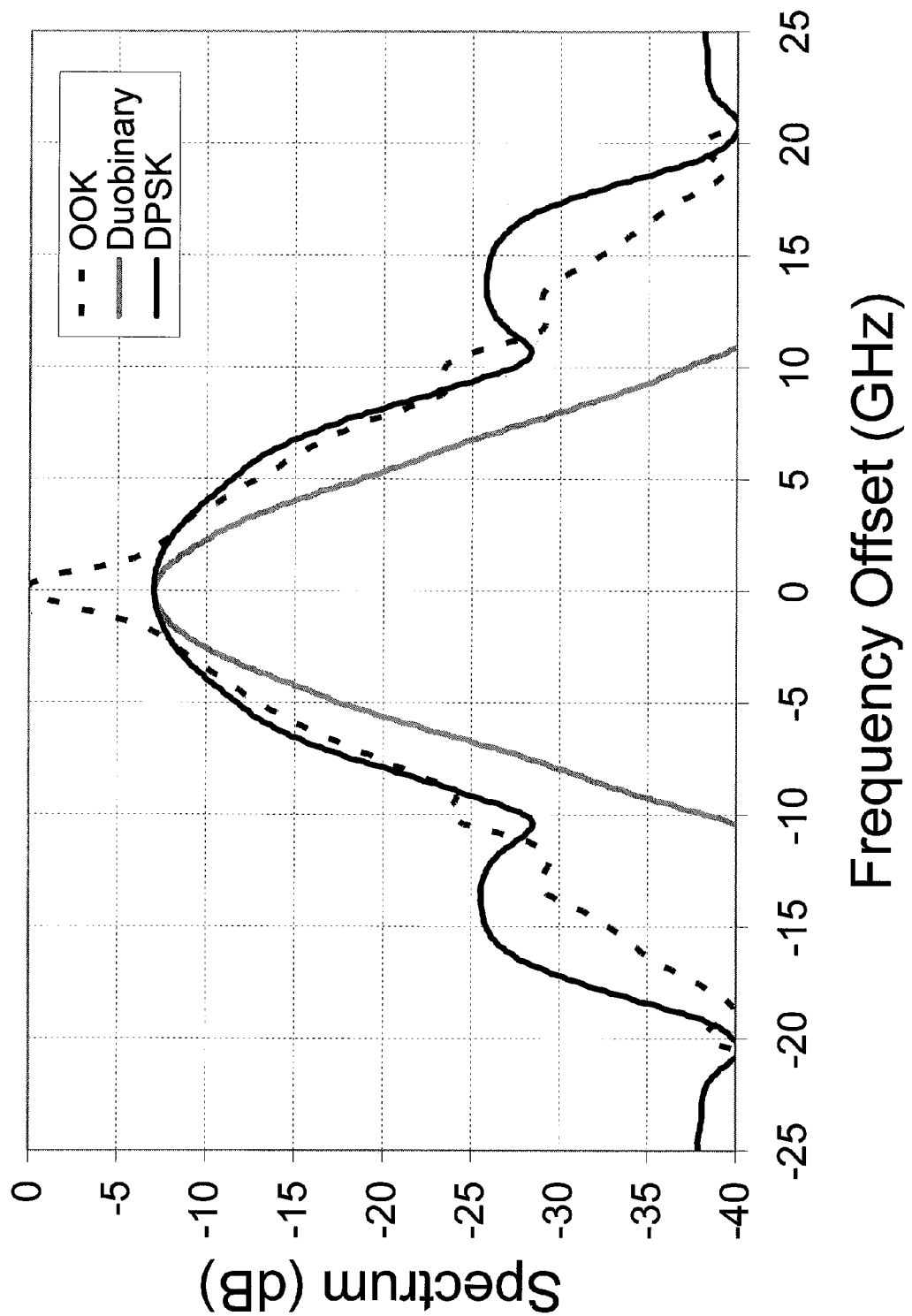
FIG. 1A displays measured optical power spectra for several modulation formats at 10 Gb/s, showing the narrower optical spectrum of duobinary modulation as compared to OOK and DPSK modulation.
Figure 1B:
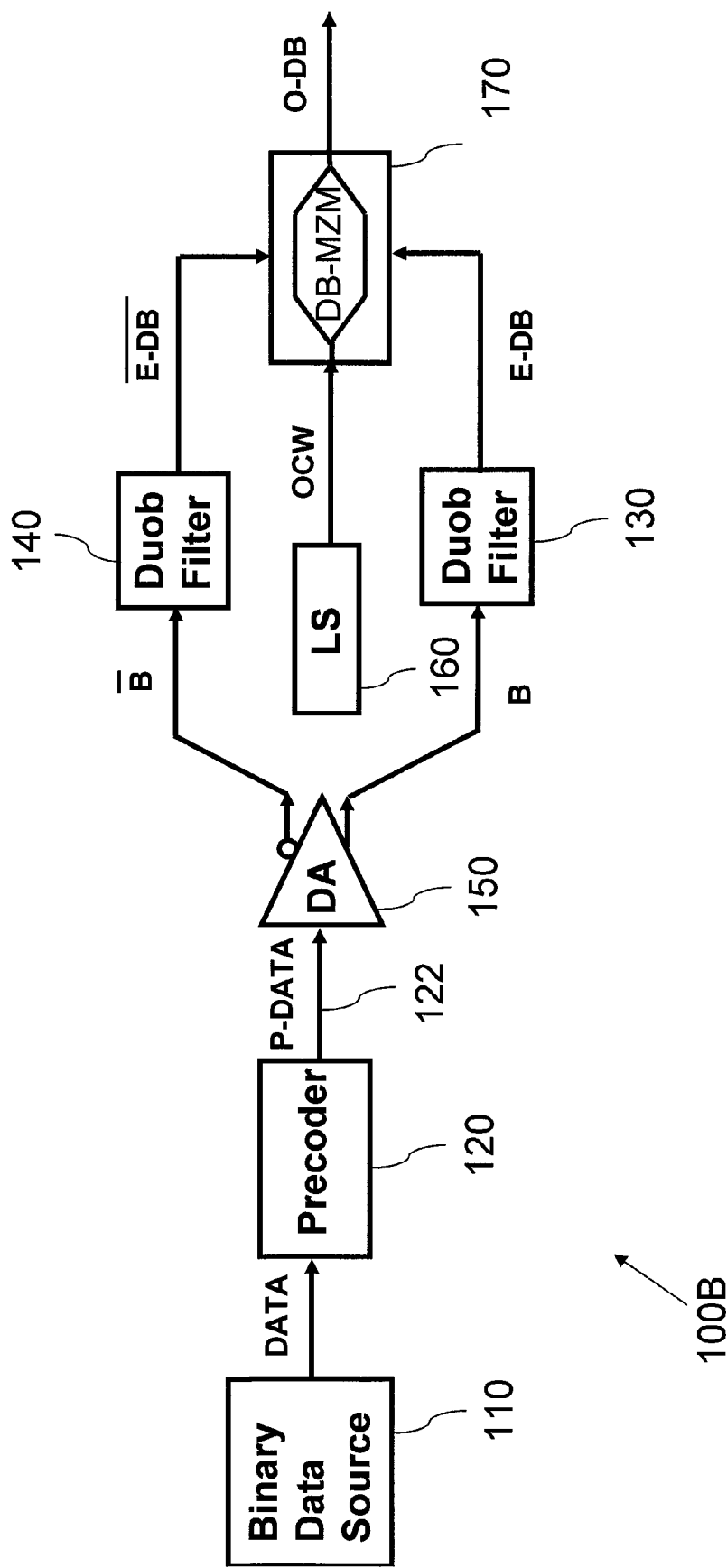
FIG. 1B is a block diagram showing a conventional optical duobinary transmitter based on dual-drive MZM.
Figure 1C:
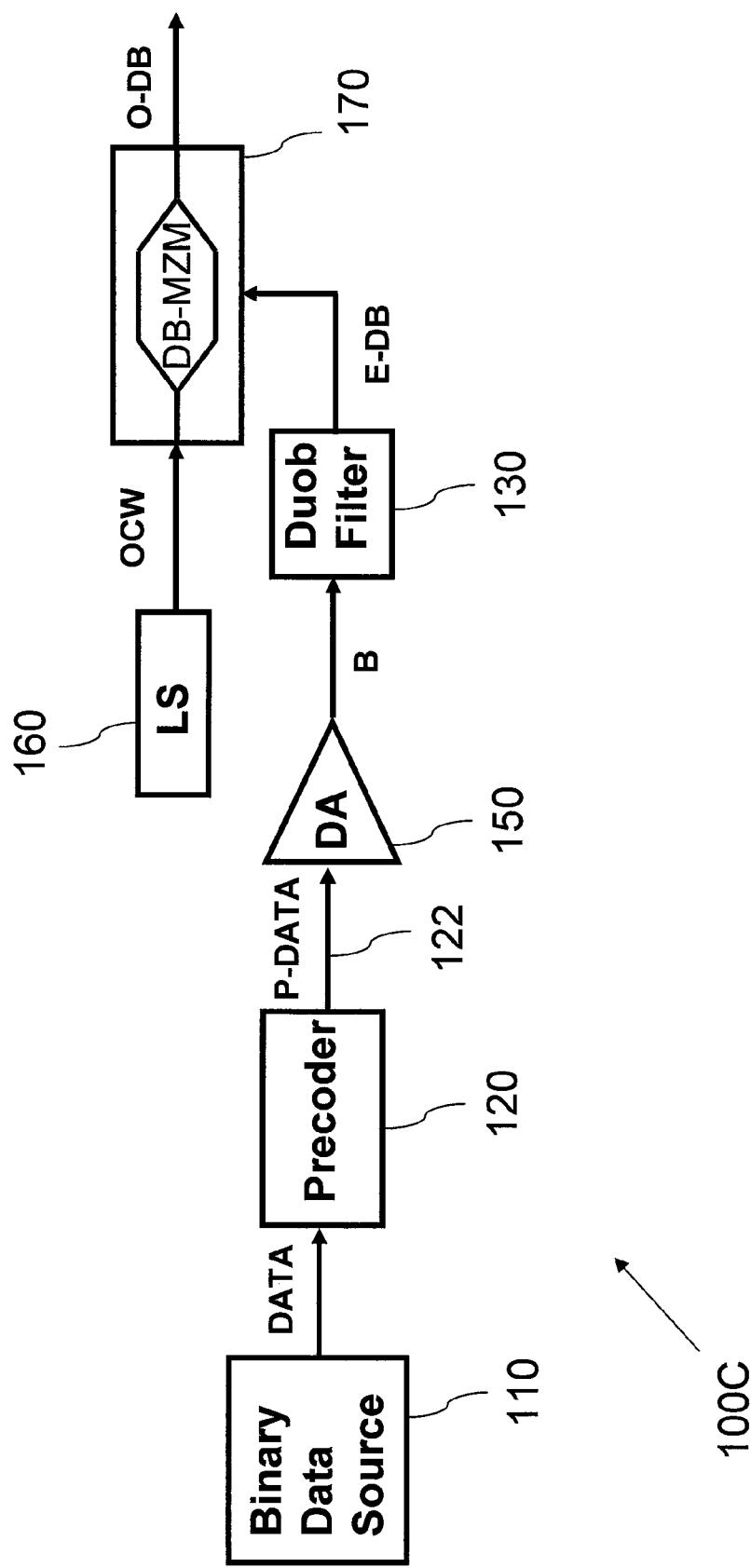
FIG. 1C is a block diagram showing a conventional optical duobinary transmitter based on single-drive MZM.
Figure 1D:
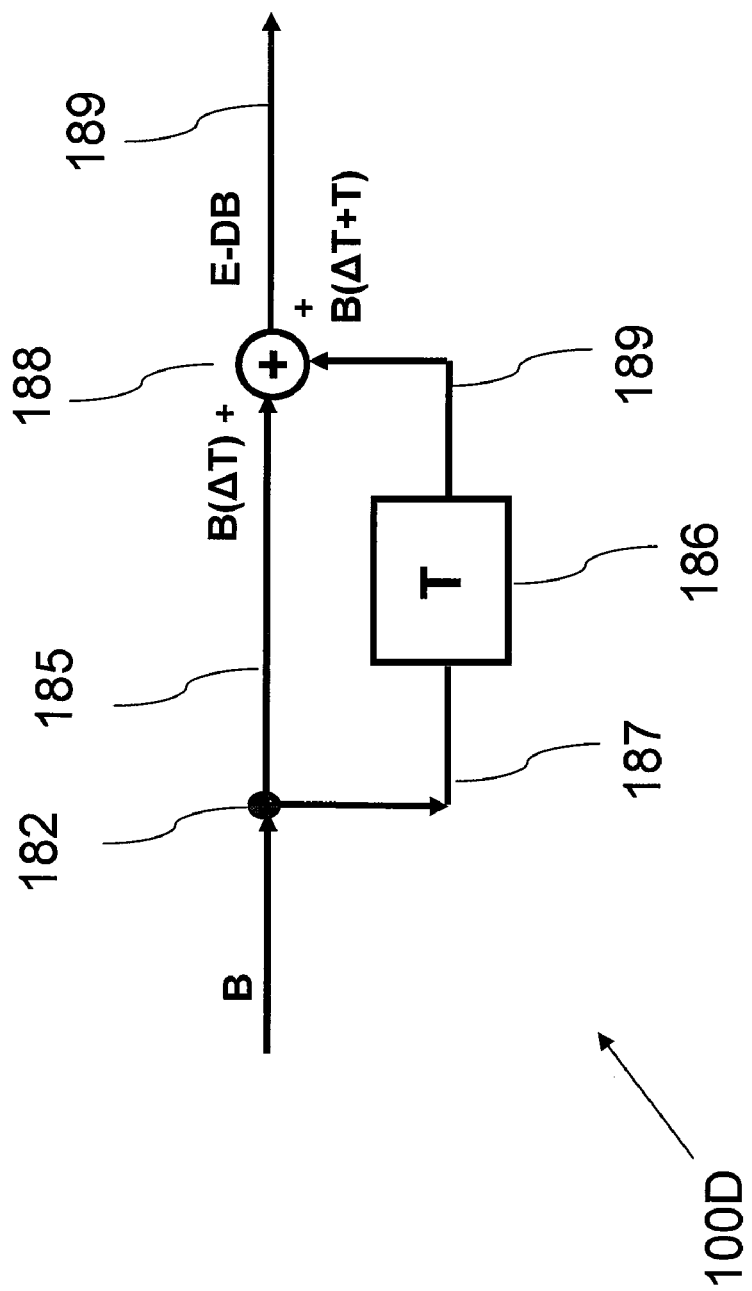
FIG. 1D is a block diagram of a conventional electronic duobinary filter consisting of a delay-and-add circuit used in electronic or optical duobinary transmitters.
Figure 2:
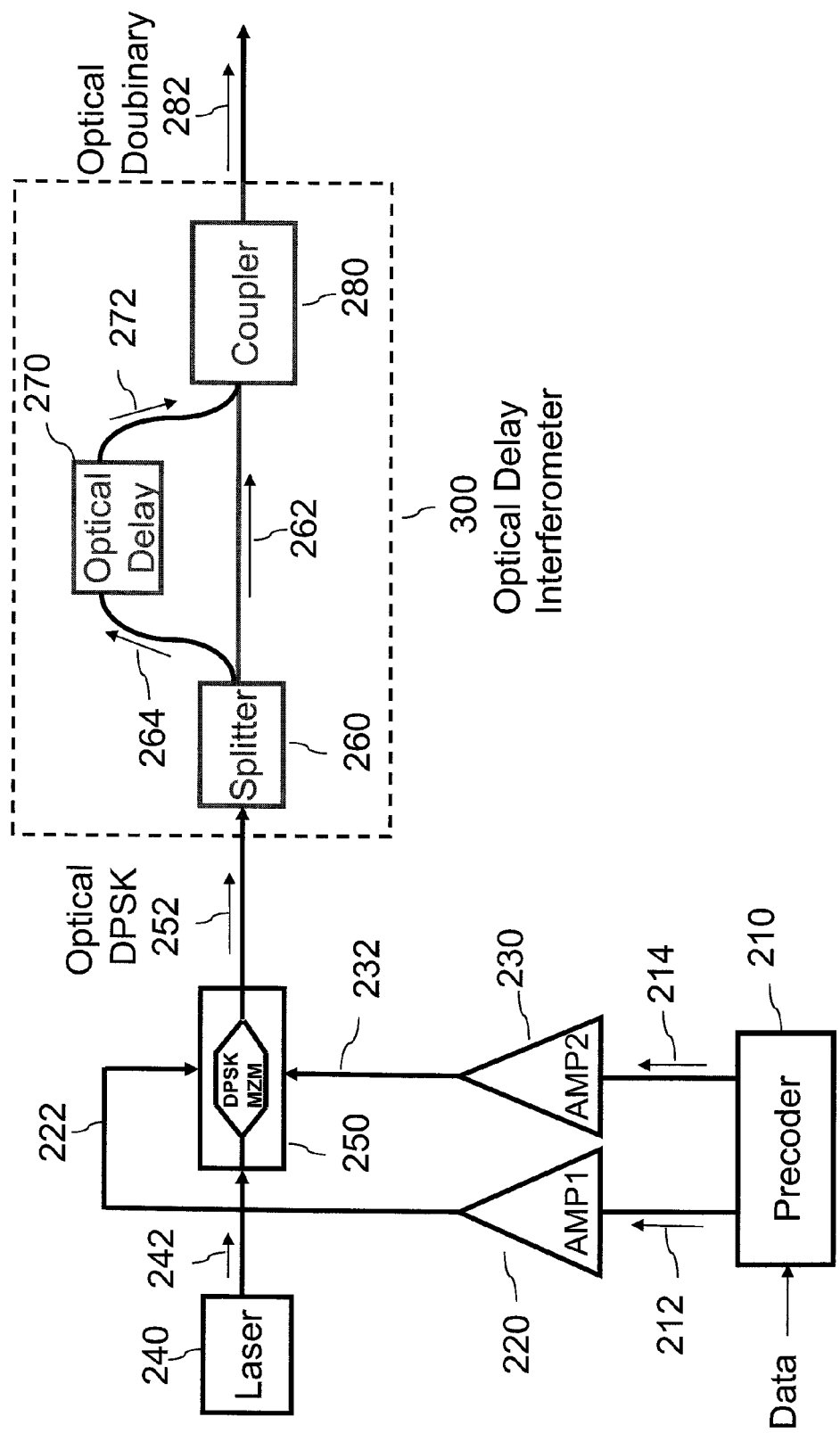
FIG. 2 is a block diagram of an optical duobinary transmitter having an optical delay interferometer used as the optical duobinary generating filter, according to the prior art.
Figure 3A:
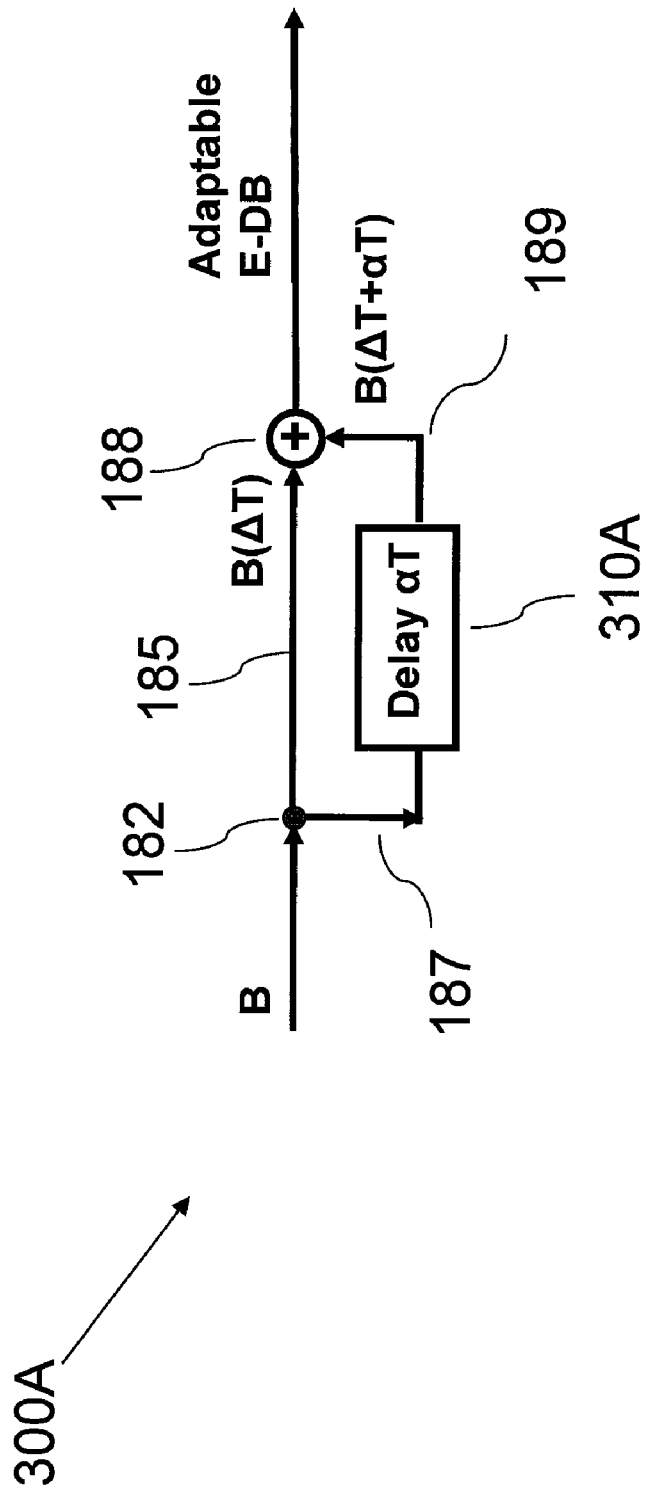
FIG. 3A is a block diagram of an adaptable electronic duobinary filter, according to an embodiment of the present invention.

According to an embodiment of the present invention, an adaptable electronic duobinary generating filter 300A is provided, as shown in FIG. 3A. This electronic duobinary generating filter 300A can be used in electronic as well as optical communication systems. The adaptable electronic duobinary generating filter 300A includes an adaptable delay element 310A and an adder 188. It is understood that any adding mechanism can be used in place of the adder 188, such as RF couplers/combiners used at high bit rates, for example.

In operation, incoming binary data B having a bit rate 1/T is input into an electronic splitter 182 which splits data B into two signals. The first split signal propagates towards adder 188 through transmission line 185, accumulating a nominal propagation delay of $\alpha T$. The nominally delayed incoming binary data will be denoted as $B(\Delta T)$ in the figure. The second split signal propagates through transmission line 187, passes through the adaptable delay element 310A, and then propagates through transmission line 189. The second split signal's propagation through transmission lines 187 and 189 results in a cumulative nominal propagation delay $\Delta T$. Note that the nominal propagation delay $\Delta T$ over transmission line 185 is substantially equal to the nominal propagation delay $\Delta T$ over transmission lines 187 and 189. In addition, the second split signal's propagation through the adaptable delay element 310A results in an additional controlled delay of $\alpha T$, where $\alpha$ is an adjustable adaptation parameter of the adaptable delay element 310A. Therefore, at the input to adder 188, the second split signal has a total delay of $\Delta T+\alpha T$, and will be hereon called delayed binary data denoted by $B(\Delta T+\alpha T)$ in the figure.

Adder 188 receives and adds the delayed binary data $B(\Delta T+\alpha T)$ with the nominally delayed incoming binary data $B(\Delta T)$, and outputs an adaptable electronic duobinary signal (Adaptable E-DB signal). The adaptation parameter $\alpha$ is adjusted as needed to optimize the duobinary system performance. For example, by adjusting the adaptation parameter $\alpha$ to be in the range $0<\alpha<1$, one may effectively increase the spectral bandwidth of the adaptable E-DB signal, thereby counteracting the distortion caused by narrow filters or other narrow bandwidth elements in the system.

Figure 3B:
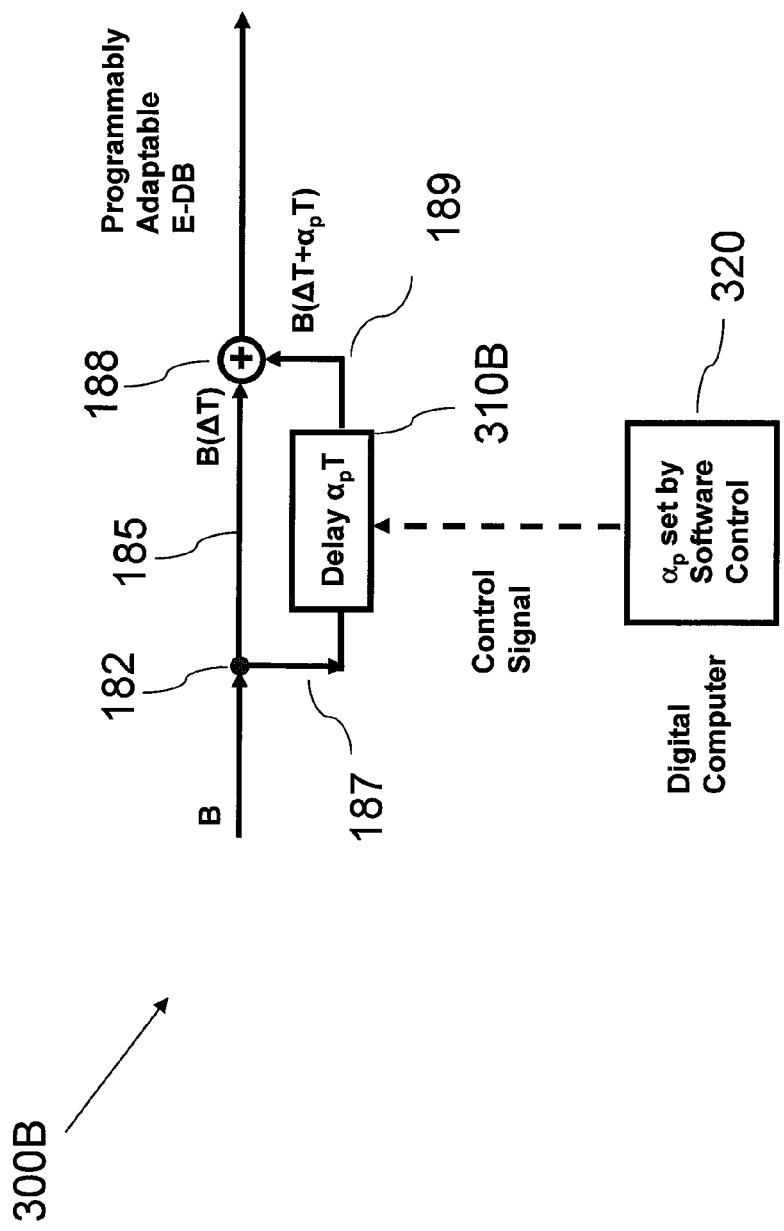
FIG. 3B is a block diagram of a programmably adaptable electronic duobinary filter, according to an embodiment of the present invention.

According to an additional embodiment of the present invention, a programmably adaptable electronic duobinary generating filter 300B is provided, as shown in FIG. 3B. In this optional embodiment, the delay element is a programmable delay element 310B, whereby the programmable adaptation parameter $\alpha p$ is controlled by a digital computer 320 to optimize the adaptable E-DB signal for mitigating certain deterministic system impairments. Note in this embodiment, the programmable delay element 310B is able to vary its delay by varying the adaptation parameter $\alpha p$, in response to a control signal issued from digital computer 320. The output of the programmably adaptable duobinary generating filter 300B is a programmably adaptable electronic duobinary signal (Programmably adaptable E-DB signal). Typical deterministic system impairments for which this embodiment may be preferred include those system impairments which can be predicted in advance or discovered during system deployment, and which cause a known degree of signal distortion. For example, typical deterministic system impairments may include a known amount of signal spectral filtering by various components along the electronic communication channel (not shown here), such as a known length of RF transmission line on a PCB board.

In operation, to mitigate against certain deterministic system impairments, the adaptation parameter $\alpha p$ can be set through software control from digital computer 320 as indicated by the dashed line. In case of such predictable system impairments, the adaptation parameter $\alpha p$ can be programmed differently to adapt the programmably adaptable E-DB signal for different system configurations. Note that the adaptation parameter $\alpha p$ could also be re-programmed by the digital computer to meet changing system impairments, either automatically or via human operator issues software commands.

Figure 3C:
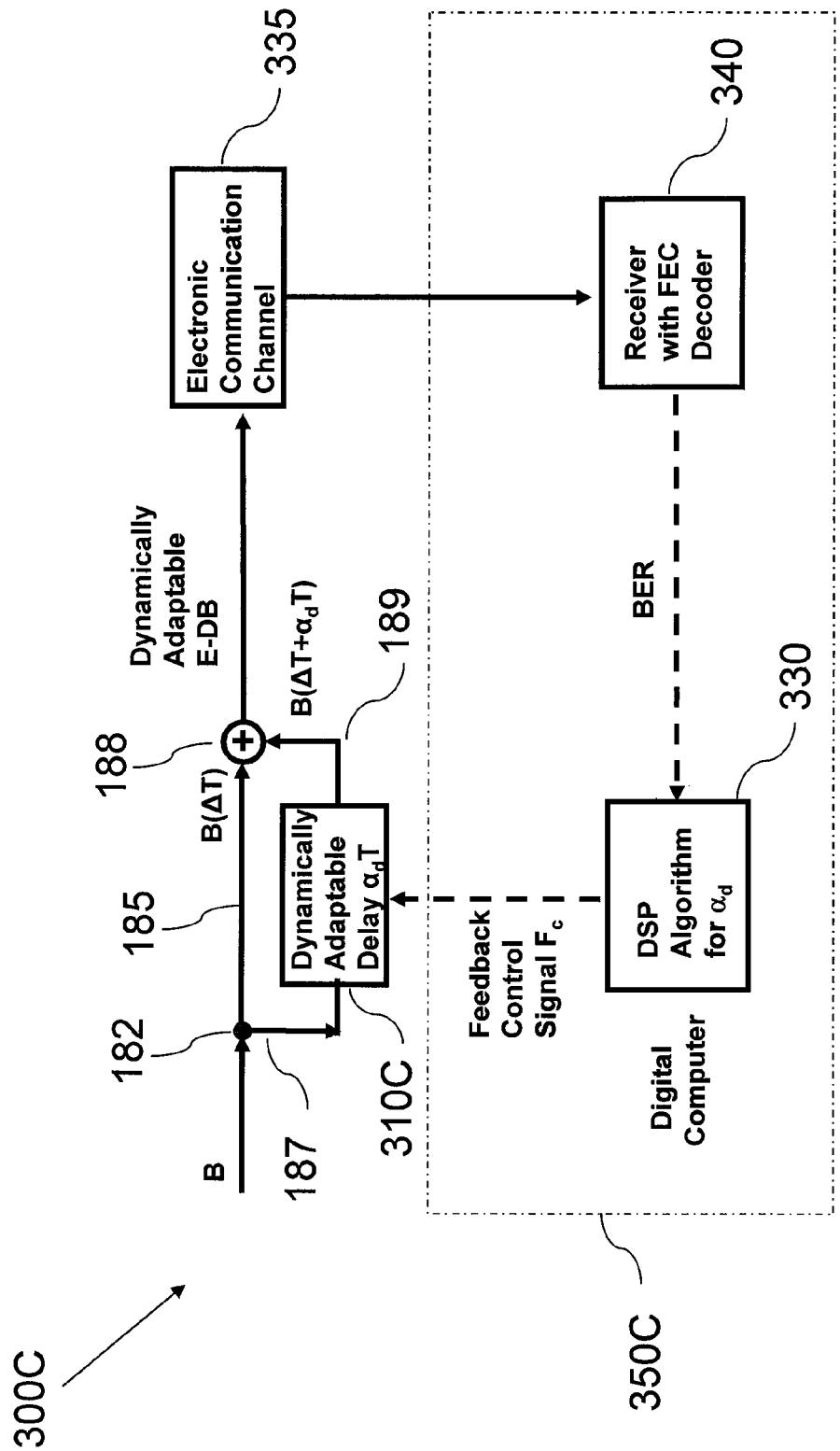
FIG. 3C is a block diagram of a dynamically adaptable electronic duobinary filter having a feedback control system, according to an embodiment of the present invention.

According to yet another embodiment of the present invention, a dynamically adaptable electronic duobinary generating filter 300C is provided, as shown in FIG. 3C. In this optional embodiment, the delay element is a dynamically adaptable delay element 310C, whereby the adaptation parameter $\alpha d$ is controlled by a feedback system 350C for dynamically adjusting the adaptation parameter $\alpha d$ to optimize the dynamically adaptable electronic duobinary signal (Dynamically adaptable E-DB signal) for dynamically varying system impairments. The feedback system 350C includes a digital computer 330 which processes bit-error rate (BER) information sent back from the receiver 340, whereby the computer 330 generates the required feedback control signal Fc shown as a dashed line connecting digital computer 330 and the dynamically variable delay element 310C. This implementation requires the duobinary receiver to generate an estimate of the bit error rate (BER), for example obtained from a forward error correction (FEC) decoder in the receiver, and sent back to transmitter using a telemetry channel or FEC overhead on the bi-directional communication link. Alternatively, instead of BER, some other information can be used as the feedback error signal to control the adaptation parameter $\alpha d$, such as a measured eye opening, or a null in the signal spectrum measured at the receiver. The dynamically adaptable electronic duobinary generating filter can be useful for communication systems with dynamically varying system impairments, such as a PCB trace or other electronic component whose transmission properties may vary with temperature, vibration, etc, and which cannot be effectively mitigated with a fixed adaptation parameter.

One possible implementation of a feedback mechanism 350C includes a digital computer 330 which optimizes ad depending on the BER information sent back from the duobinary receiver 340. The BER information is processed according to an optimization algorithm to generate the required feedback control signal Fc to the dynamically variable delay element 310C. The digital computer 330 continuously monitors the BER sent back from the duobinary receiver to determine whether ad needs to be re-adjusted. Where the system impairments are dynamically variable, this embodiment allows for the continuous automatic adjustment of the adaptation parameter $\alpha d$ to counteract signal distortions stemming from the dynamic system impairments, as well as deterministic or non-varying system impairments. Note that communication of BER information between receiver and transmitter can take advantage of the bi-directional nature of communication systems, as well as the FEC overhead typically employed in modern digital communication systems.

Figure 4A:
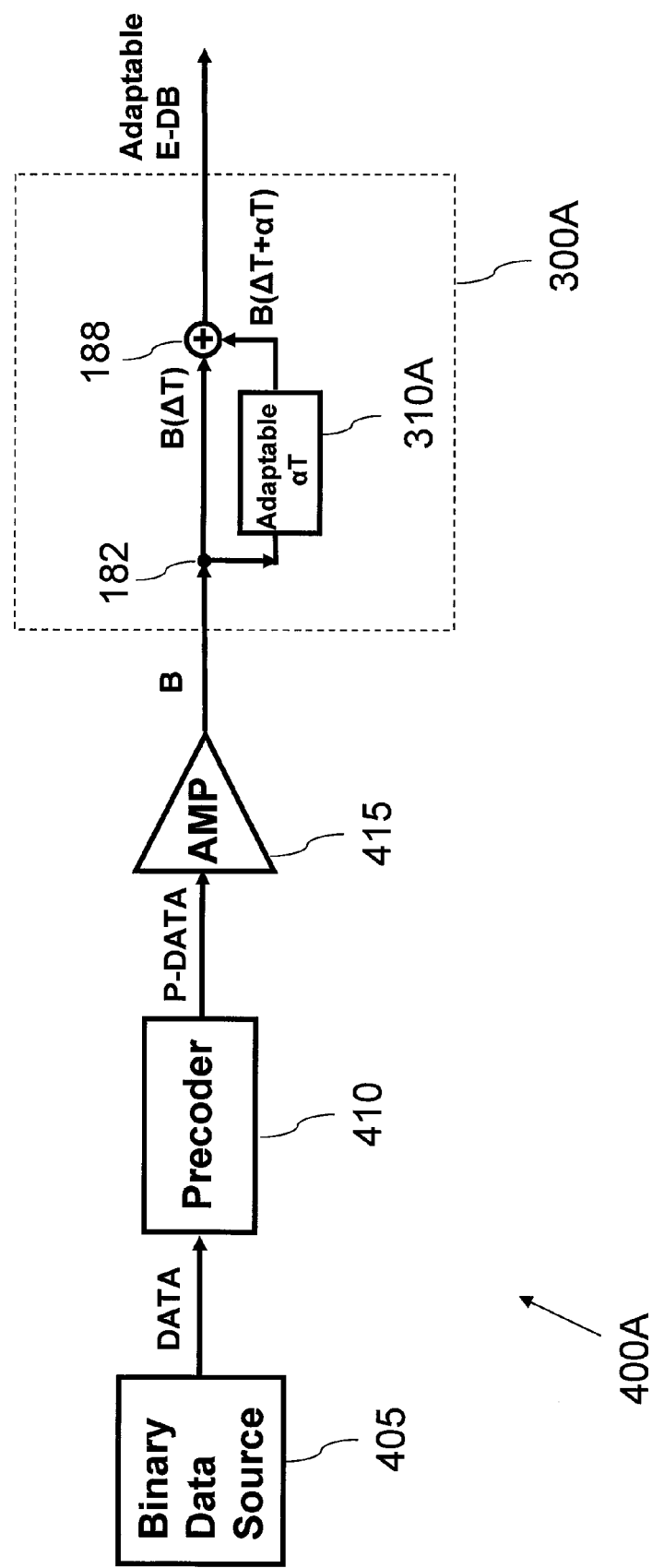
FIG. 4A is a block diagram of an adaptable electronic duobinary transmitter, according to an embodiment of the present invention.

According to another embodiment of the present invention, an adaptable electronic duobinary transmitter 400A is provided, as shown in FIG. 4A. In this optional embodiment, the adaptable electronic duobinary generating filter 300A (shown in FIG. 3A) is incorporated into an adaptable electronic duobinary transmitter 400A. The adaptable electronic duobinary transmitter 400A also includes a binary data source 405, precoder 410, and an optional amplifier (AMP) 415.

In operation, the binary data source generates a binary DATA input to precoder 410. The precoder performs differential encoding, and outputs the precoded binary signal P-DATA to AMP 415. The AMP amplifies the signal, and outputs the amplified precoded binary data B to the adaptable electronic duobinary generating filter 300A. The adaptable electronic duobinary generating filter 300A then outputs an adaptable E-DB signal. Note that DC blocking capacitors (not shown) may be included between the precoder 410 and AMP, and between AMP and the adaptable electronic duobinary filter 300A. Other possible known implementations, such as placing the AMP at output of adaptable electronic duobinary generating filter 300, and/or additional AMPs (not shown) may be possible but will not be discussed for simplicity.

Figure 4B:
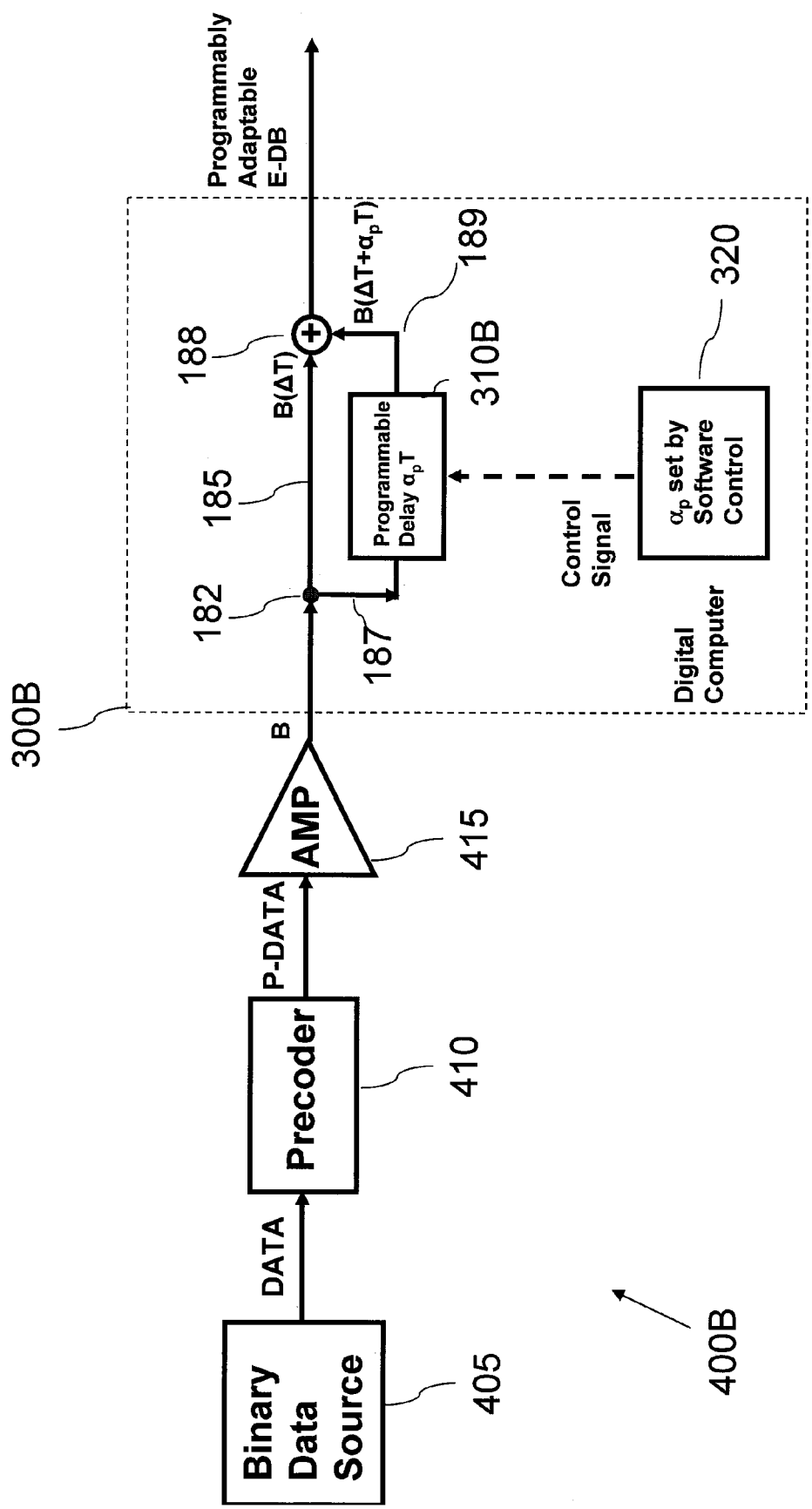
FIG. 4B is a block diagram of a programmably adaptable electronic duobinary transmitter, according to an embodiment of the present invention.

According to yet another embodiment of the present invention, a programmably adaptable electronic duobinary transmitter 400B is provided, as shown in FIG. 4B. Instead of the adaptable electronic duobinary filter 300A, a programmably adaptable electronic duobinary generating filter 300B is included, generating a programmably adaptable E-DB signal.

In operation, DATA is input into the precoder 410 which differentially precodes the DATA and outputs a differentially precoded binary signal P-DATA. The AMP receives the output of the precoder and outputs an amplified precoded binary signal B to the programmably adaptable electronic duobinary generating filter 300B, which outputs a programmably adaptable E-DB signal. The digital computer 320 is provided for programmable control of the adaptation parameter $\alpha$ by a human operator or by a fully automated software control. In the latter case, for example, a system may be able to automatically discover the nature of the system impairments (e.g. number of filtering elements in the transmission path, length of an RF transmission line, etc.), and automatically program the adaptation parameter $\alpha$ for optimum performance.

Figure 4C:
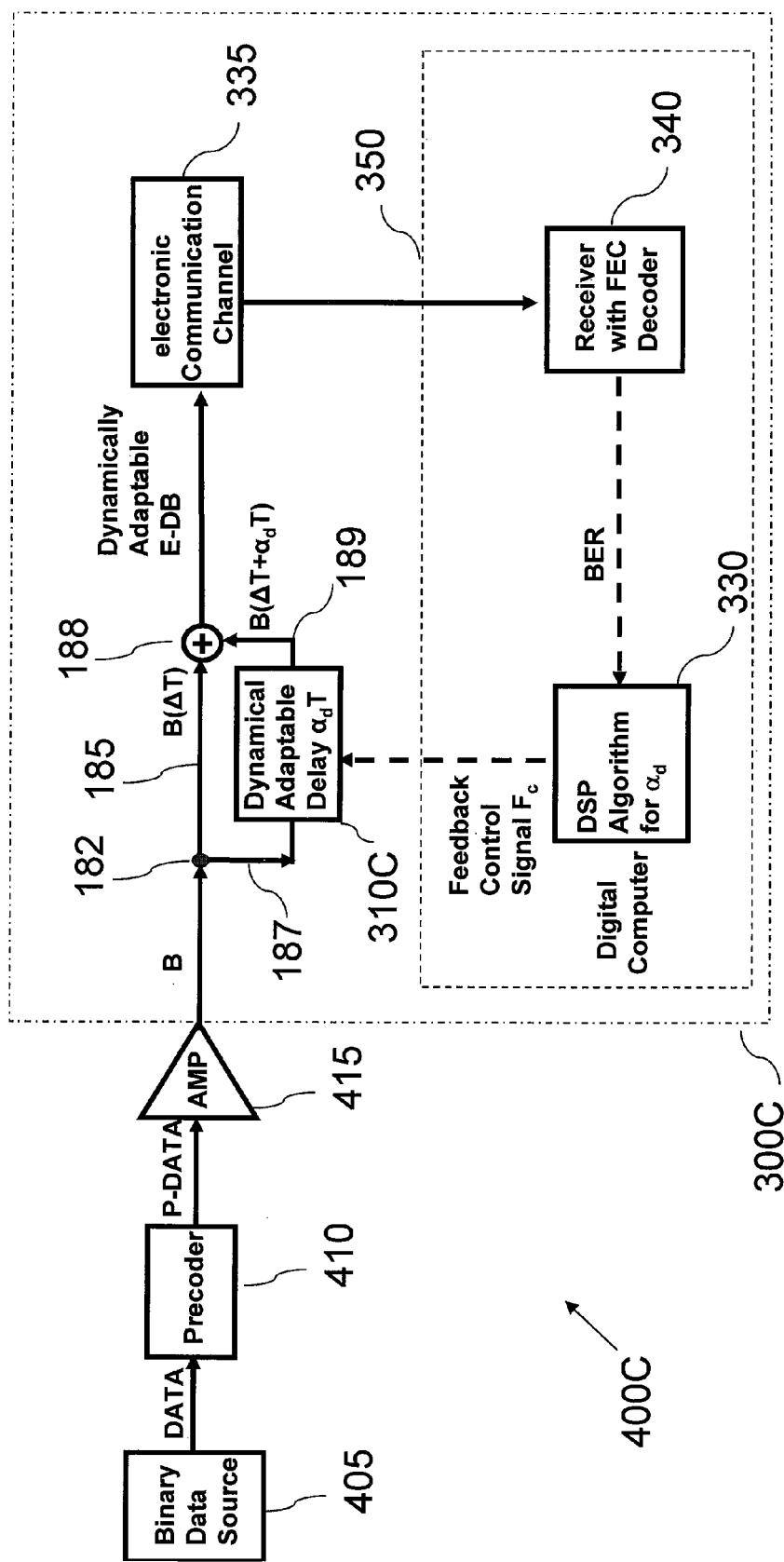
FIG. 4C is a block diagram of a dynamically adaptable electronic duobinary transmitter, according to an embodiment of the present invention.

According to an additional embodiment of the present invention, a dynamically adaptable electronic duobinary transmitter 400C is provided in a dynamic feedback system, as shown in FIG. 4C. In this embodiment, a dynamically adaptable duobinary filter 300C is used. The feedback system 350C is included to continuously adjust $\alpha d$ to the dynamically varying system impairments. A dynamically adaptable E-DB signal is output from the dynamically adaptable electronic duobinary transmitter 400C, this output signal being adaptable continuously to counteract the effects of the dynamically varying system impairments.

Note that either the adaptable electronic duobinary transmitter 400A, programmably adaptable electronic duobinary transmitter 400B or dynamically adaptable electronic duobinary transmitter 400C would be useful to mitigate RF impairments for electronic backplane transmissions between optical transceivers, including PIC based transceivers, in a communication chassis.

Figure 5A:
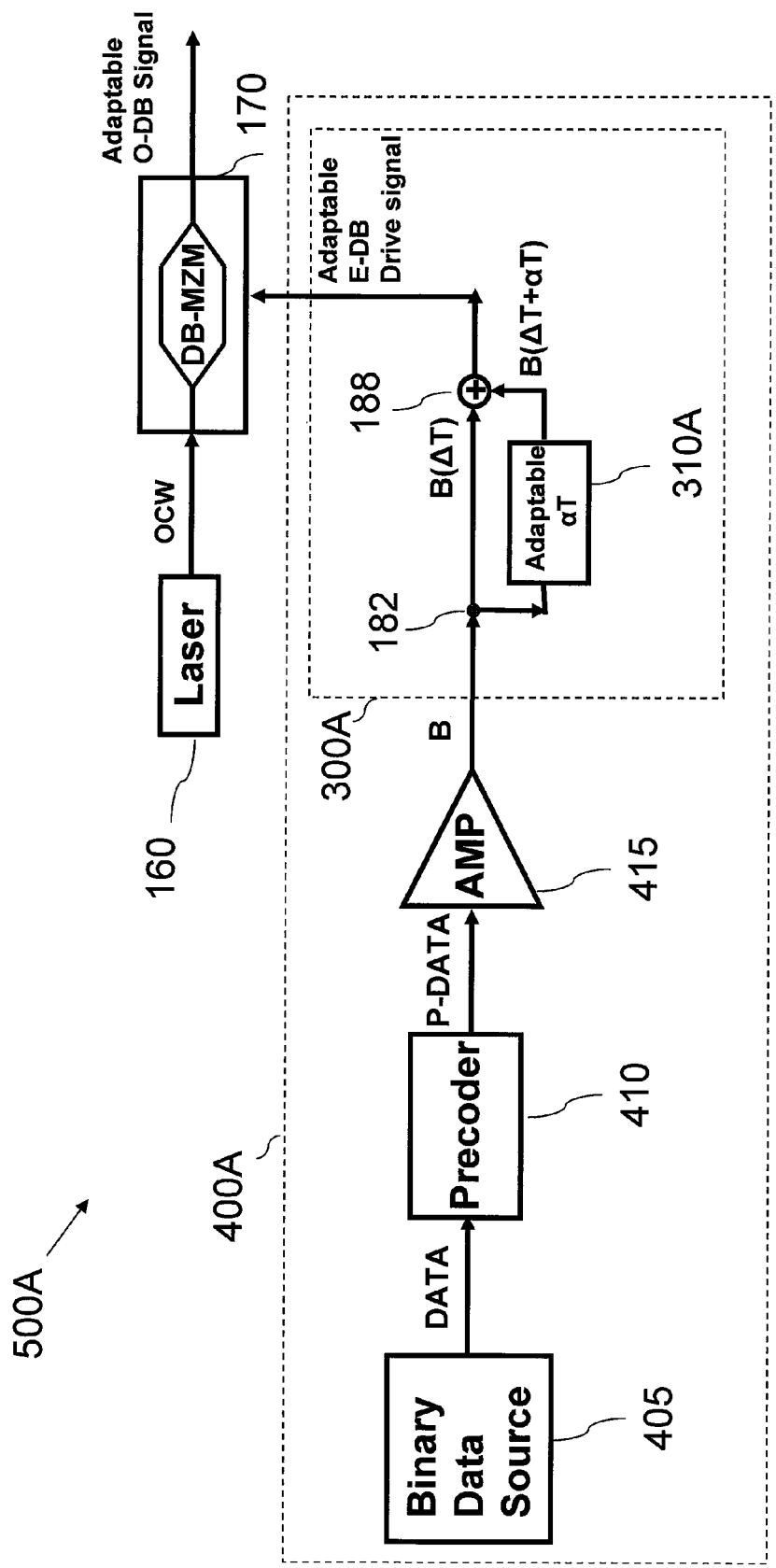
FIG. 5A is a block diagram of an adaptable optical duobinary transmitter, according to an embodiment of the present invention.

According to yet another embodiment of the present invention, an adaptable optical duobinary transmitter 500A is provided, as shown in FIG. 5A. In this embodiment, the adaptable electronic duobinary transmitter 400A provides an adaptable E-DB drive signal to the single-drive MZM of the adaptable optical duobinary transmitter 500A. In the context of an adaptable optical duobinary transmitter 500A, the adaptable electronic duobinary transmitter can be characterized as an adaptable electronic duobinary driving circuitry producing an adaptable electronic duobinary drive signal (Adaptable E-DB drive signal). Also included is a single-drive optical duobinary MZM 170, and a light source (LS) 160, such as a distributed feedback (DFB) semiconductor laser. For simplicity, henceforth an optical duobinary modulator and MZM will be used interchangeably.

In operation, a precoded and amplified binary signal B is processed by the adaptable electronic duobinary generating filter 300A into an adaptable E-DB signal to drive a single-drive MZM 170. LS 160 generates a CW optical carrier wave (OCW) at a predetermined wavelength $\lambda$. The MZM 170 modulates the light from the LS 160 according to the adaptable E-DB drive signal to generate an adaptable optical duobinary signal (Adaptable O-DB signal). Note that by varying the adaptation parameter $\alpha$, we may beneficially shape the adaptable O-DB signal spectrum to mitigate various system impairments.

Figure 5B:
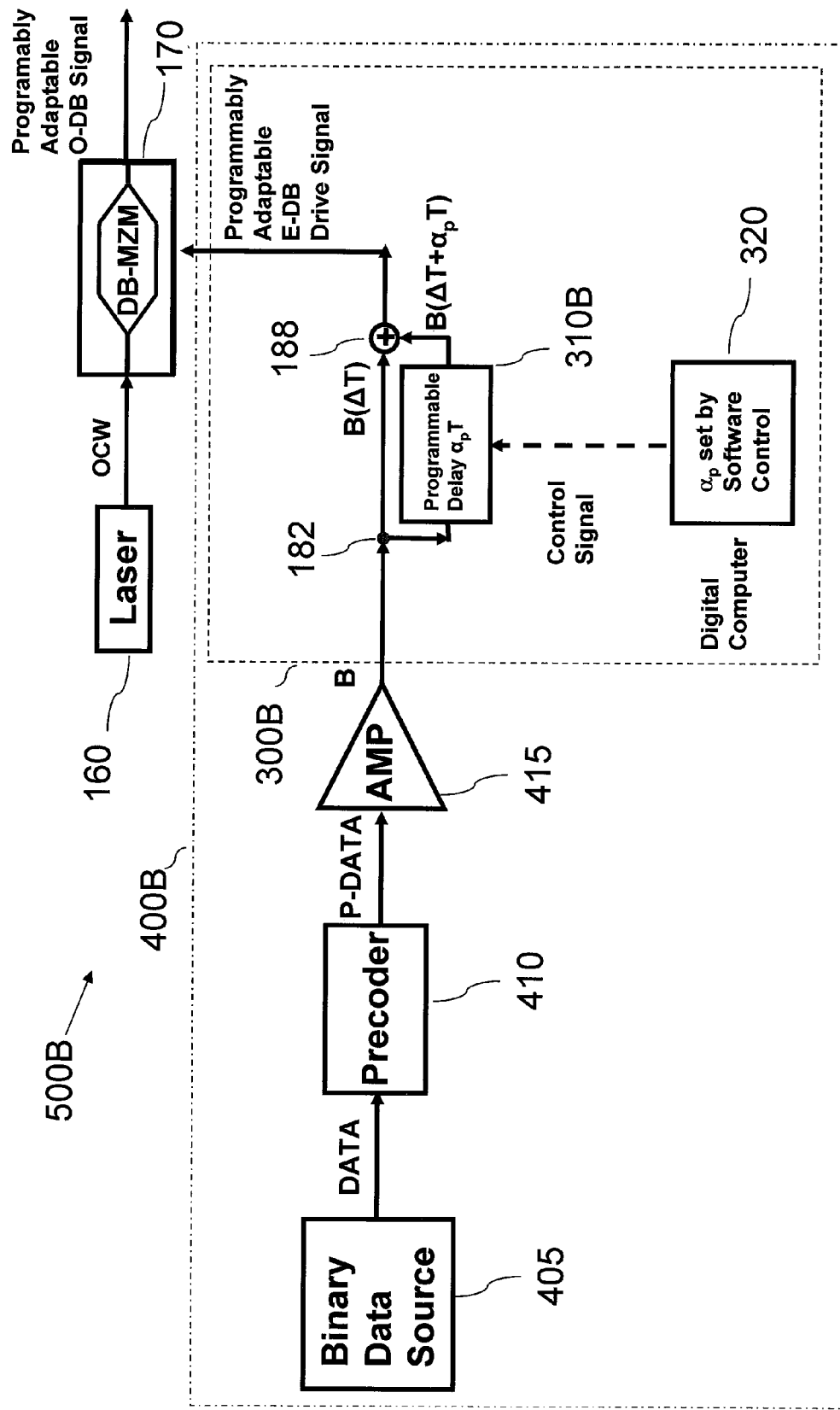
FIG. 5B is a block diagram of a programmably adaptable optical duobinary transmitter, according to an embodiment of the present invention.

According to another embodiment of the present invention, a programmably adaptable optical duobinary transmitter 500B is provided, as shown in FIG. 5B. In this embodiment, the electronic duobinary transmitter is a programmably adaptable electronic duobinary transmitter 400B which can be characterized in this context as a programmably adaptable electronic duobinary driving circuitry, generating the programmably adaptable E-DB drive signal for the optical MZM 170. Also included is a LS 160.

In operation, a precoded and amplified binary signal B is processed by the programmable duobinary generating filter 300B, which has a programmably adaptable parameter $\alpha p$, programmed to mitigate various deterministic system impairments. The MZM 170 modulates the OCW from the LS 160 according to the programmably adaptable E-DB drive signal to generate a programmably adaptable optical duobinary signal (Programmably adaptable O-DB signal).

Figure 5C:
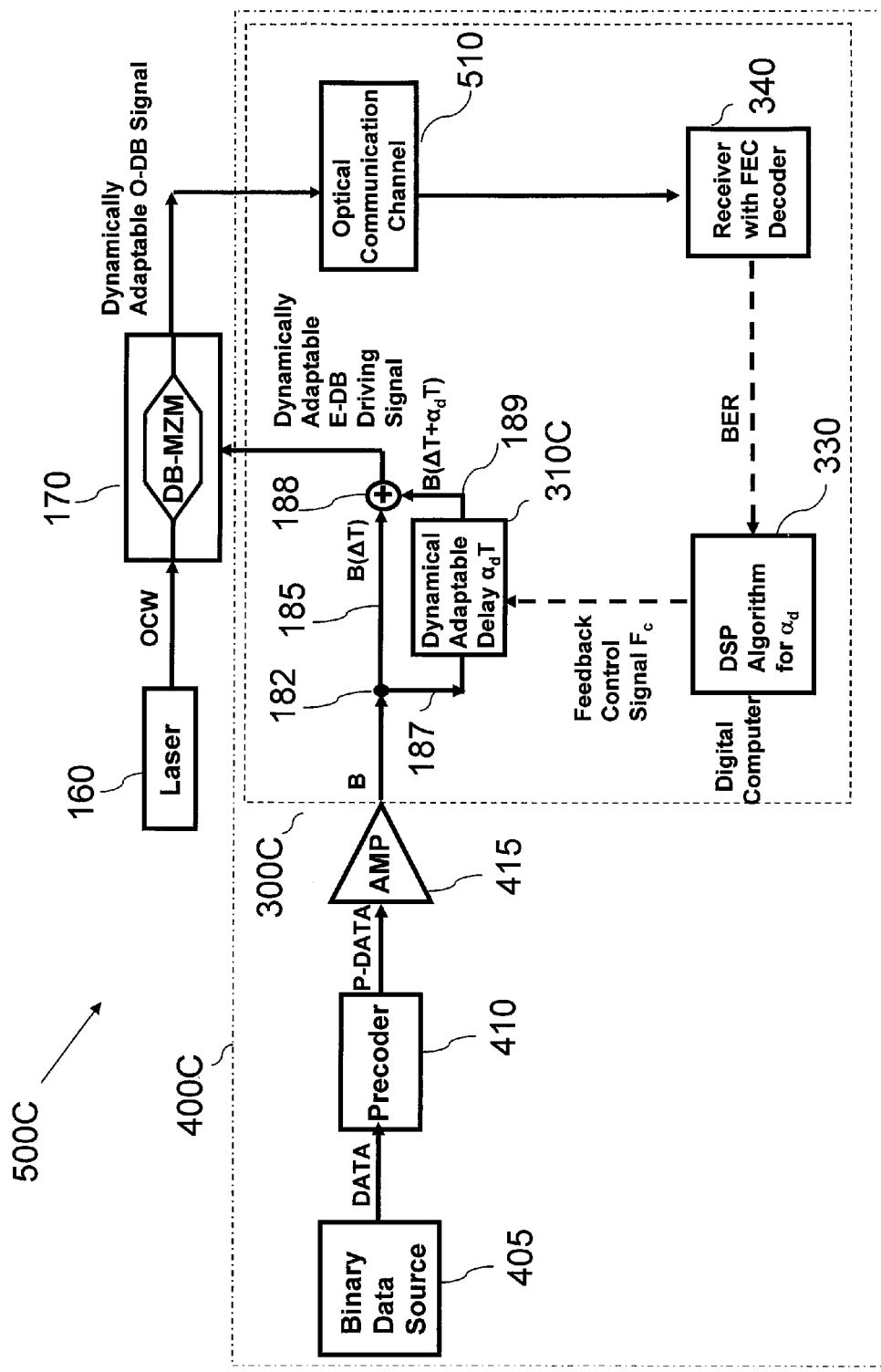
FIG. 5C is a block diagram of a dynamically adaptable optical duobinary transmitter, according to an embodiment of the present invention.

According to yet another embodiment of the present invention, a dynamically adaptable optical duobinary transmitter 500C is provided, as shown in FIG. 5C. In this embodiment, the electronic duobinary transmitter is the dynamically adaptable electronic duobinary transmitter 400C which can be characterized in this context as a dynamically adaptable electronic duobinary driving circuitry, generating the dynamically adaptable E-DB drive signal for the optical MZM 170. Also included is a LS 160.

In operation, a precoded and amplified binary signal B is processed by the dynamically adaptable duobinary generating filter 300C, which has a dynamically variable adaptation parameter $\alpha d$, dynamically varied to overcome for various dynamically changing system impairments. The MZM 170 modulates the CW light from the LS 160 according to the dynamically adaptable E-DB drive signal to generate a dynamically adaptable O-DB signal.

Figure 6A:
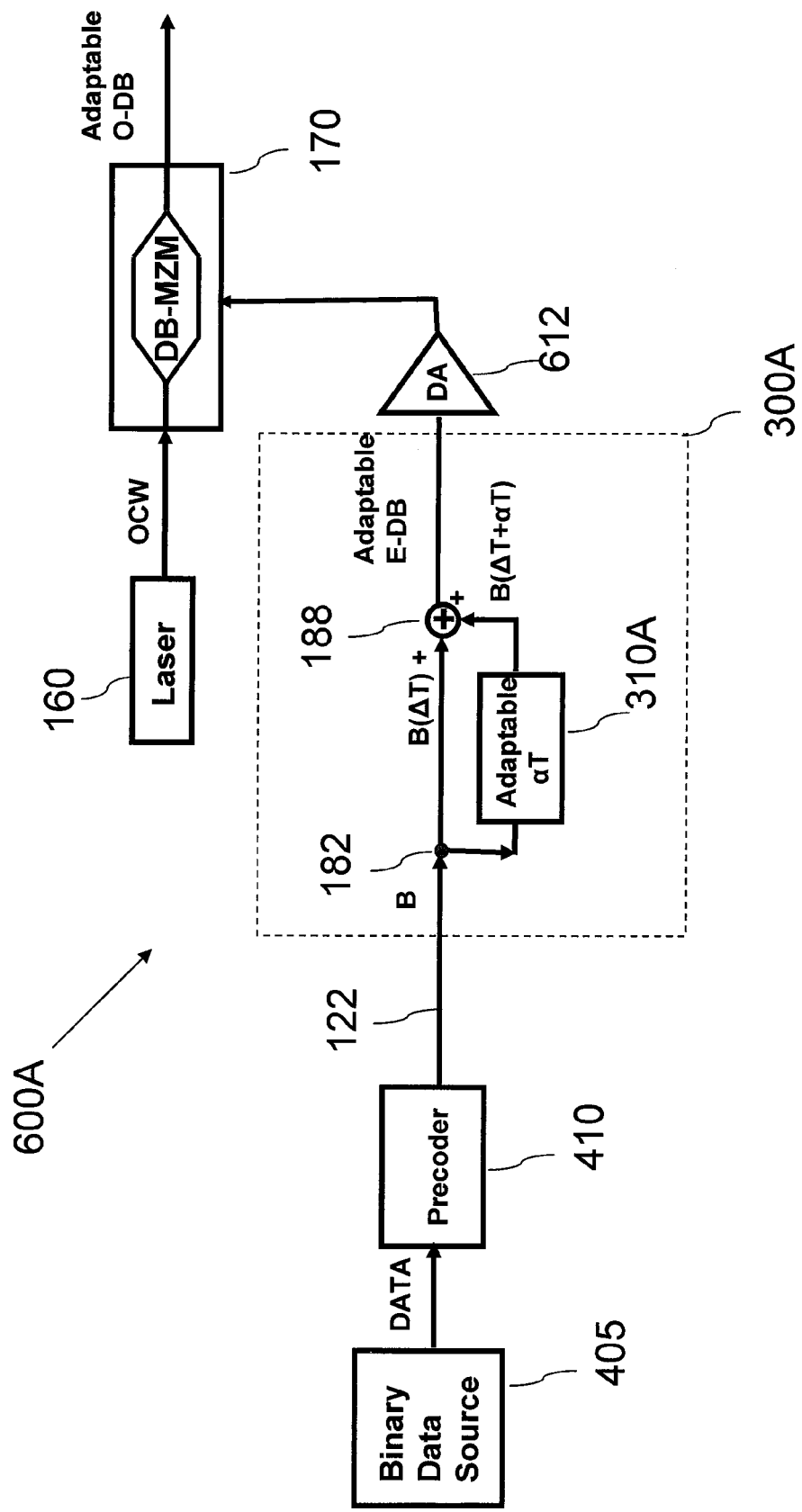
FIG. 6A is a block diagram of an alternative embodiment of an adaptable optical duobinary transmitter with an optional AMP, according to an exemplary embodiment of the invention.

An alternative exemplary embodiment of an adaptable optical duobinary transmitter 600A is illustratively provided and is shown in FIG. 6A. As shown, AMP 415 is eliminated and instead AMP 612 can follow the adaptable electronic duobinary filter 300A. Notice, that although not illustrated, if a programmably adaptable optical duobinary transmitter 500B is used, AMP 415 can be eliminated and instead AMP 612 can follow the corresponding programmable electronic duobinary filter 300B. Similarly, although not illustrated, if a dynamically adaptable optical duobinary transmitter 500C is used, then AMP 415 can be eliminated and instead AMP 612 can follow the corresponding adaptable electronic duobinary filter 300C.

Figure 6B:
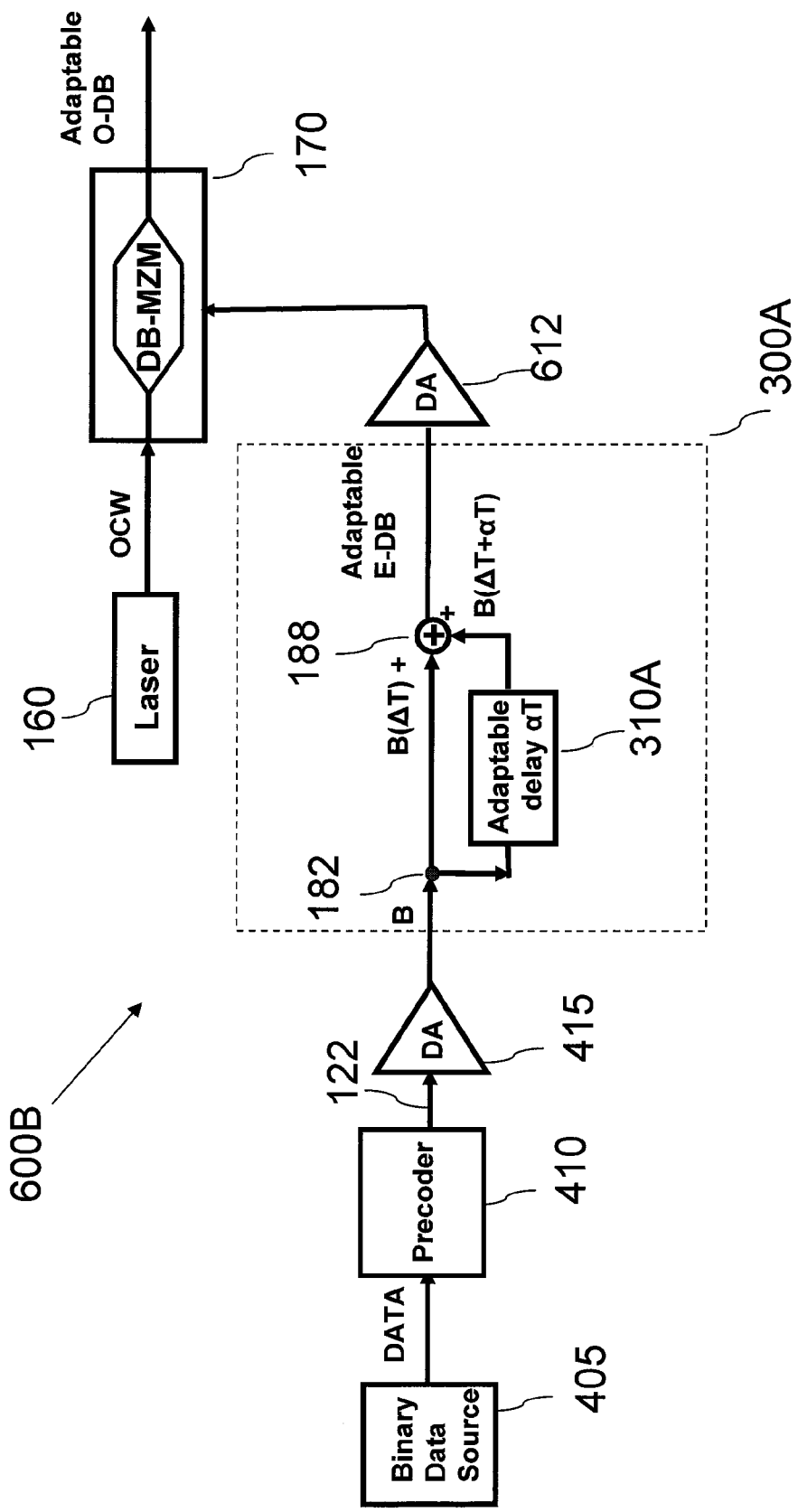
FIG. 6B is a block diagram of an alternative embodiment of an adaptable optical duobinary transmitter with two optional AMPs, according to an exemplary embodiment of the invention.

An alternative exemplary embodiment of an adaptable optical duobinary transmitter 600B is illustratively provided and is shown in FIG. 6B. In this figure, the adaptable electronic duobinary filter 300A is between AMP 415 and AMP 612. Notice, that although not illustrated, if a programmably adaptable optical duobinary transmitter 500B is used, then the corresponding programmable electronic duobinary filter 300B can be placed between AMP 415 and AMP 612. Similarly, although not illustrated, if a dynamically adaptable optical duobinary transmitter 500C is used, then the corresponding adaptable electronic duobinary filter 300C can be placed between AMP 415 and AMP 612.

It is to be understood that those skilled in the art may place the AMPs differently in any of the adaptable, programmably adaptable or dynamically adaptable optical duobinary transmitters, and may use additional AMPs to implement the invention, but all such variations are within the scope of this invention. In addition, it is understood that various AC coupling circuits may be used by those skilled in the art to implement the invention, but all such variations are still within the scope of this invention.

Figure 7:
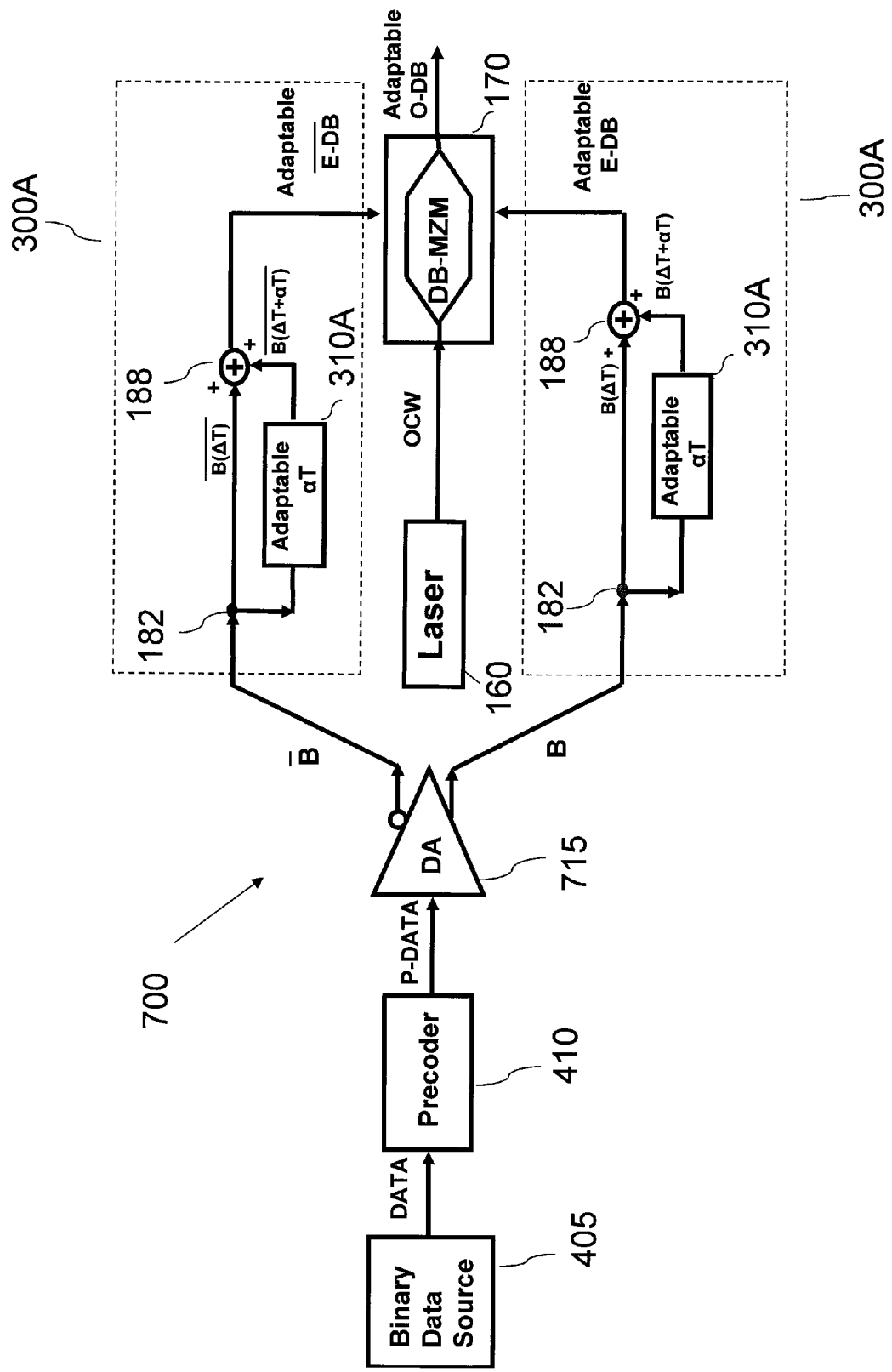
FIG. 7 is a block diagram of an adaptable optical duobinary transmitter in a dual-drive MZM configuration, according to an exemplary embodiment of the invention.

According to yet another embodiment of the present invention, an adaptable optical duobinary transmitter 700 is illustratively provided, as shown in FIG. 7. The adaptable optical duobinary transmitter 700 includes a binary data source 405, precoder 410, and a driver AMP 715 with two differential output signals. The two differential outputs of driver AMP 715 feed into a first and second adaptable electronic duobinary filters 300A. The value of the adaptation parameter $\alpha$ of the two adaptable duobinary electronic filters 300A is set to be identical. A dual-drive MZM 170 and a LS 160 are also included. Although not shown, additional AMPs may be included. Similarly, although not illustrated, instead of the adaptable electronic duobinary filter 300A, a programmably adaptable electronic duobinary filter 300B can be placed in such a dual-drive MZM. Also, similarly, although not illustrated, instead of the adaptable electronic duobinary filter 300A, a dynamically adaptable electronic duobinary filter 300C can be placed in such a dual-drive MZM with the associated feedback control system.

In operation, DATA is differentially precoded by precoder 410 into a precoded binary P-DATA signal. The P-DATA signal is amplified in AMP 715 which outputs and respectively to the first and second adaptable electronic duobinary filters 300A. The first and second adaptable electronic duobinary filters 300A respectively output adaptable signal and complementary adaptable signal. The CW light from LS 160 is modulated by MZM 170 according to the first and second adaptable duobinary signals in a push-pull fashion. The MZM 170 outputs an adaptable O-DB signal.

Note that in one preferred embodiment, both first and second adaptable electronic duobinary filters 300A have their adaptation parameter $\alpha$ set to identical values Similarly, although not shown, in a dual-arm MZM design using two programmably adaptable electronic duobinary filters 300B, both adaptation parameters will be programmed to be identical. Similarly, in a dual-arm MZM design using two dynamically adaptable electronic duobinary filters 300C, the adaptation parameters of the two filters will be changing dynamically synchronously, so that at any point in time, the adaptation parameters of both filters are identical.

Figure 8:
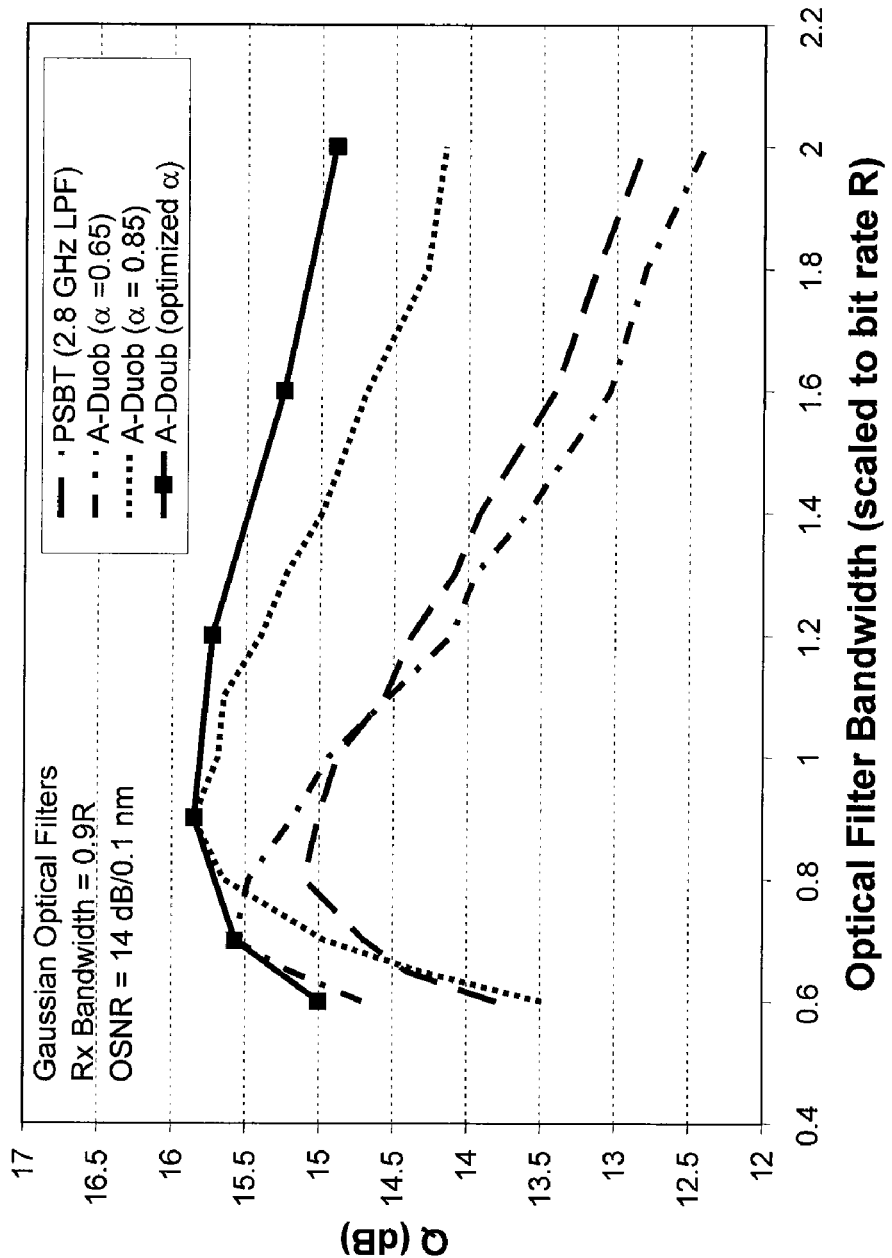
FIG. 8 is a graph of computer simulated curves of receiver Q-factor as function of optical filter bandwidth for a conventional LPF generated optical duobinary (labeled PSBT), and the adaptable optical duobinary system (labeled A-Duob) for different values of adaptation parameter $\alpha$.

FIG. 8 shows computer simulation results illustrating the superior performance of an adaptable optical duobinary system (labeled as A-Duob in figure) compared with a conventional low-pass filter (LPF) generated duobinary (labeled as PSBT in figure). The conventional LPF generated duobinary or PSBT is modeled using a Bessel shaped LPF with bandwidth equal to 28% of bitrate. Several plots are shown of simulated receiver Q-factor versus optical filter bandwidth for A-Duob with different $\alpha$ parameter (dotted and dashed-dotted curves), as well as PSBT (dashed curve). We also show a plot (solid curve) where the $\alpha$ parameter is optimized for each value of optical filter bandwidth. The optical filter models the impact of filtering by WDM filters and/or OADMs. Note that a value of scaled optical filter bandwidth (scaled to bit rate) less than 1 indicates strong optical filtering effects.

As can be seen in the simulation results of FIG. 8, the A-Duob format can be adaptable for each value of optical filter bandwidth by adjusting the $\alpha$ parameter. In particular, very good performance can be achieved at very narrow optical filter bandwidths by using $\alpha<1$, or a duobinary correlation period less than 1 bit. In this case, the null in adaptable duobinary generating filter frequency response moves out to a higher frequency at $f=0.5(1/\alpha T)$, thus compensating for narrow optical filtering in the channel. The solid curve shows the Q-factor for A-Duob with $\alpha$ adaptable at each optical filter bandwidth (in practice this would be implemented with an electronically programmable circuit in the transmitter). The adaptable feature of the A-Duob format enables transmission through a wide range of optical filter bandwidths with superior performance to that of PSBT or classical duobinary. This is one key advantage of the present invention over the prior art.

Figure 9A:
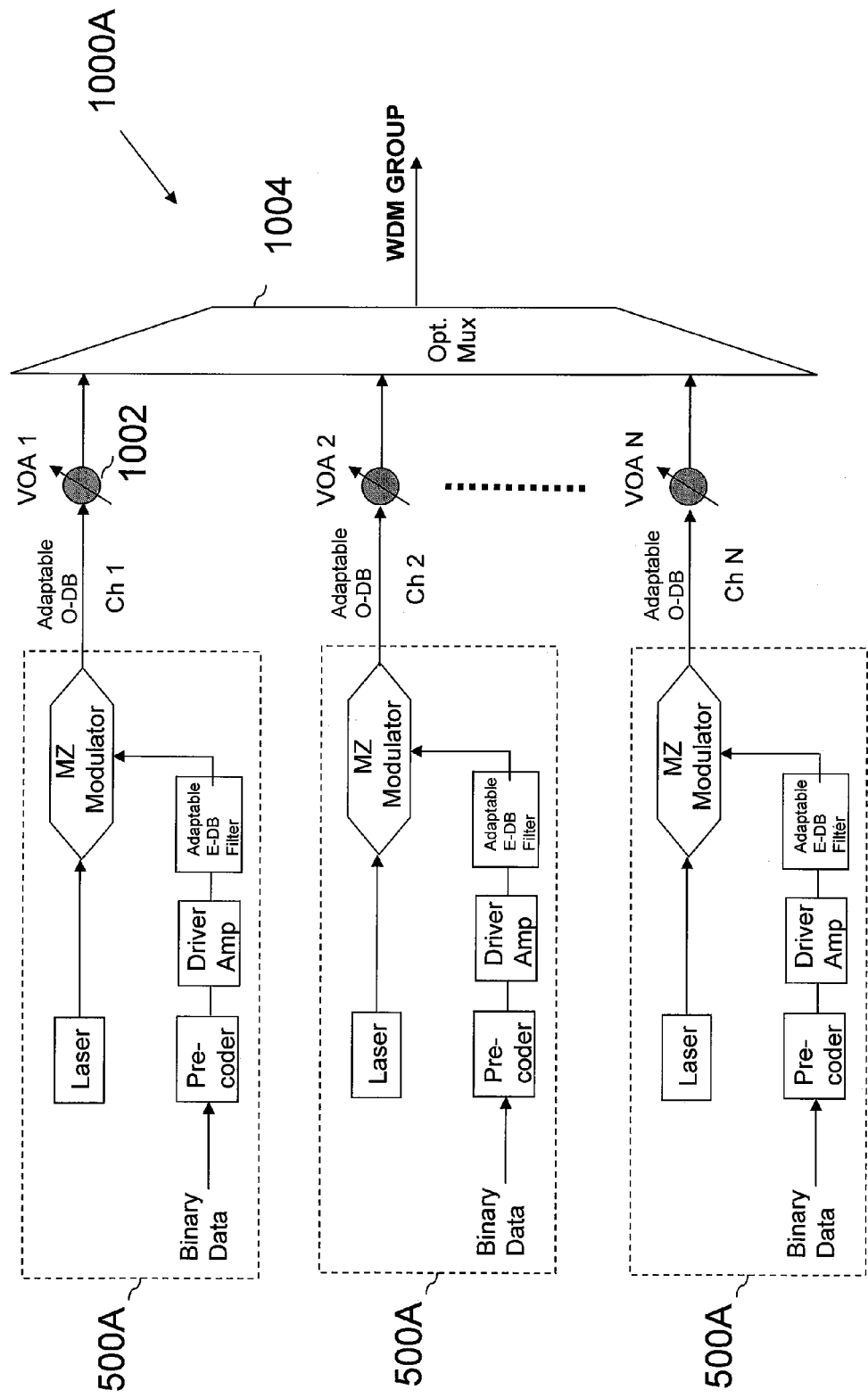
FIG. 9A is a block diagram of an N-channel Photonic Integrated Circuit (PIC), each channel having an adaptable optical duobinary transmitter, according to an aspect of the present invention.

According to an exemplary embodiment, a Photonic Integrated Circuit (PIC) having N channels each having an adaptable optical duobinary transmitter 500A integrated on the PIC, is shown in FIG. 9A. The N-channel transmitter PIC 1000A includes N adaptable optical duobinary transmitters 500A, N variable optical attenuators VOA 1002 and an optical multiplexer (O-MUX) 1004. We note that with current technology it may be difficult to monolithically integrate the electronic elements of adaptable duobinary transmitter 500A on the PIC; in practice, only the photonic elements may be monolithically integrated on the PIC, with electronic elements, such as precoder, adaptable electronic duobinary filter, and driver amp residing in the same optoelectronic package but not integrated on PIC.

Figure 9B:
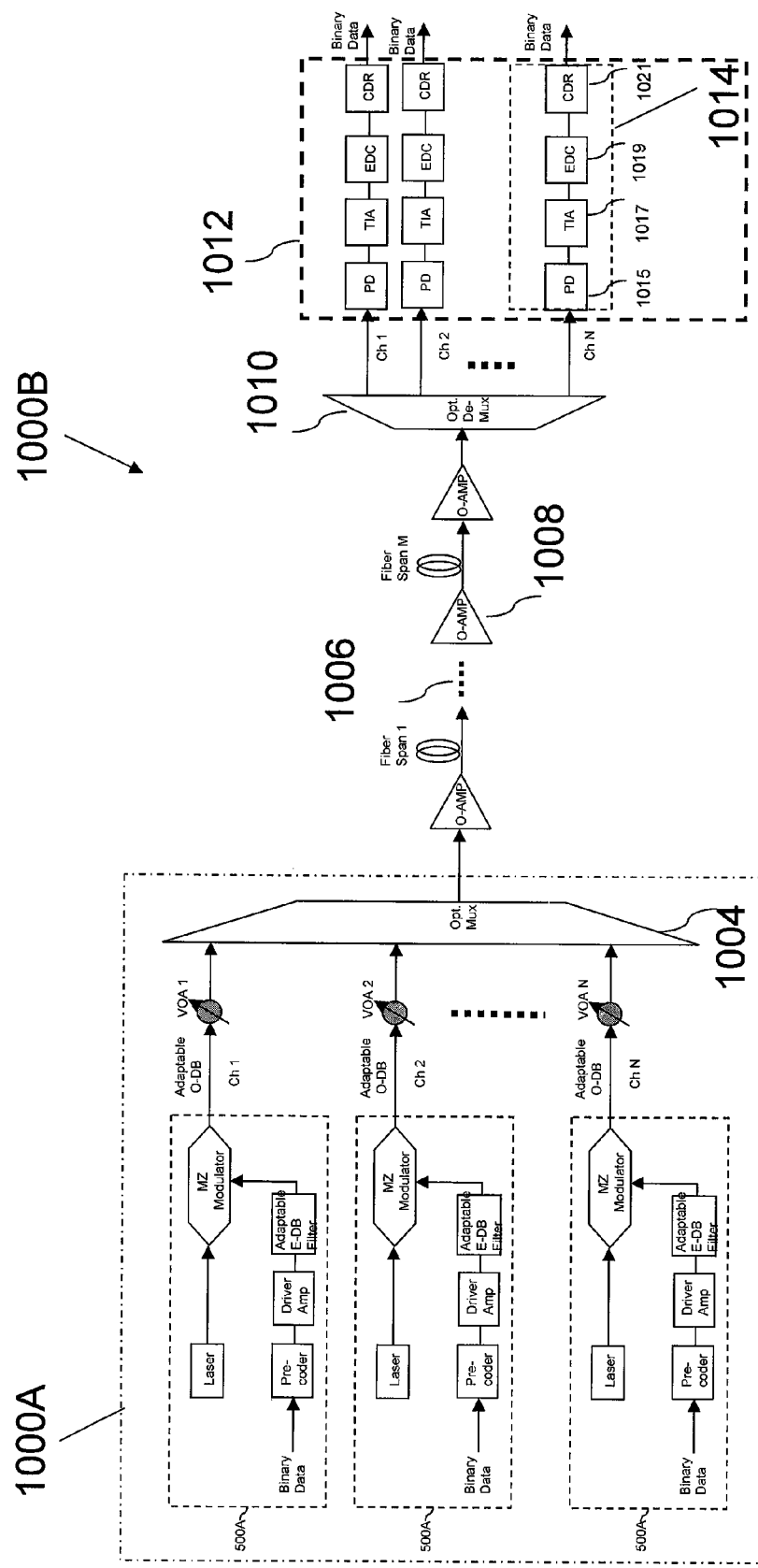
FIG. 9B is a block diagram of an optical duobinary N-Channel DWDM system, according to an exemplary embodiment of the invention.

In operation, each of the adaptable optical duobinary transmitters 500A has a CW laser light source 160 operating at a distinct wavelength, and each transmitter 500A produces an adaptable O-DB signal on its respective channel which passes though the respective VOA 1002. The respective VOA 1002 output is then optically multiplexed by the optical MUX 1004 to form a WDM group of adaptable optical duobinary signals which can then be transmitted over an optical communication channel (such as shown in FIG. 9B). Note that the WDM group may undergo additional optical multiplexing with other WDM groups, for example using optical interleavers or other multiplexing filters. For example, four WDM groups with 200 GHz channel spacing may be multiplexed with interleavers up to a denser WDM group with 50 GHz channel spacing.

Notice, that although FIG. 9A illustrates the application of N adaptable optical duobinary transmitters 500A, it is to be understood that, although not shown, programmably adaptable or dynamically adaptable optical transmitters 500B or 500C respectively, whether in a single-drive or dual-drive MZM configuration, with any combination of AMPs, etc., can also be used in a similar PIC configuration.

An exemplary DWDM system with PIC adaptable optical duobinary transmitters 500A is illustratively shown in FIG. 9B, according to an aspect of the present invention. A DWDM communication system 1000B having N-channel transmitter PIC 1000A, is shown. In this example, the output of the optical MUX 1004 is transmitted over optical communication channel 1006 through a number of fiber spans and optical amps 1008, for example. The DEMUX 1010 demultiplexes or separates the group of wavelength channels into a plurality of separate adaptable O-DB signals, inputting each into a respective receiver 1014, comprising for example a photodiode (PD) 1015, transimpedance amplifier (TIA) 1017, optional electronic dispersion compensation (EDC) circuit 1019, and clock data recovery (CDR) circuit 1021. The receiver 1014 demodulates the respective O-DB signal into an output binary data.

A number of optical add drop modules (OADM) may be present along the optical transmission line (not shown in FIG. 9B). At each OADM, some wavelength channels may be dropped, added, or passed through. Thus, depending on the number of OADMs in the optical transmission line, and the specific traffic pattern, the O-DB signals in different wavelength channels may encounter a different number of narrow filters which distort each signal to a different extent. Additionally, other features which are distinct to the channel may cause unique distortions to each individual signal.

Thus, typically, it can be expected that signals that traverse through the greatest number of OADMs will have experienced increased deleterious effects due to filtering by multiple narrow optical filters. Our adaptable optical duobinary transmitters allow each transmitter's adaptation parameter $\alpha$ to be adjusted independently to optimize the O-DB signal in that channel depending on the number of OADMs passed through by that channel, for example. Note that narrow optical filtering is just one example of a system impairment which may be mitigated by our adaptable optical duobinary transmitter or its equivalents. Our invention may be used to optimize the optical duobinary signals to mitigate other system impairments, such as imperfections in the frequency response of the MZM, or channel impairments such as fiber chromatic dispersion, for example.

It is to be understood that similarly, although not specifically shown in the figure, a DWDM system having N-channel programmably adaptable transmitter PIC based on programmably adaptable optical transmitters 500B, or N-channel dynamically adaptable transmitter PIC based on dynamically adaptable optical transmitters 500C, are also contemplated. Notice that the programmably adaptable optical duobinary transmitters 500B allow the adaptation parameters of each transmitter to be programmed differently to compensate for a different number of OADMs passed, for example. Similarly, the dynamically adaptable optical duobinary transmitter 500C will allow the adaptation parameter of each channel to be individually dynamically adjusted based on BER feedback information from the respective receiver 1014, for example.

It is also to be understood, that the system may include a plurality of any of the inventive optical duobinary transmitters either in a single-drive MZM configuration, shown in FIG. 5A, or in a dual-drive configuration, shown in FIG. 7 and/or with alternative AMPs. FIG. 9B is only a representative example of the inventive system and other variations are within the scope of this invention.

To appreciate one of the advantages of this invention, compare the number and size of photonic elements that must be integrated on the PIC using our invention versus Lee's prior art, utilizing an optical DI circuit. Our adaptable optical duobinary transmitter 500A, for example, only requires the photonic integration of the N duobinary MZM 170, laser sources LSs 160, VOAs 1002, and an optical multiplexer 1004, while the rest of our elements, being electronic, can be more cheaply integrated electronically, if desired. Lee's device, on the other hand, besides the numerous drawbacks mentioned, would also not be a desirable device for photonic integration because it requires photonic integration of N optical DIs, relatively large devices which would increase PIC die size and reduce yield. Thus, from the perspective of photonic integration, it may be more desirable to utilize the precious real estate of a PIC to increase the number of channels, rather than incorporating Lee's relatively large device.

Figure 10A:
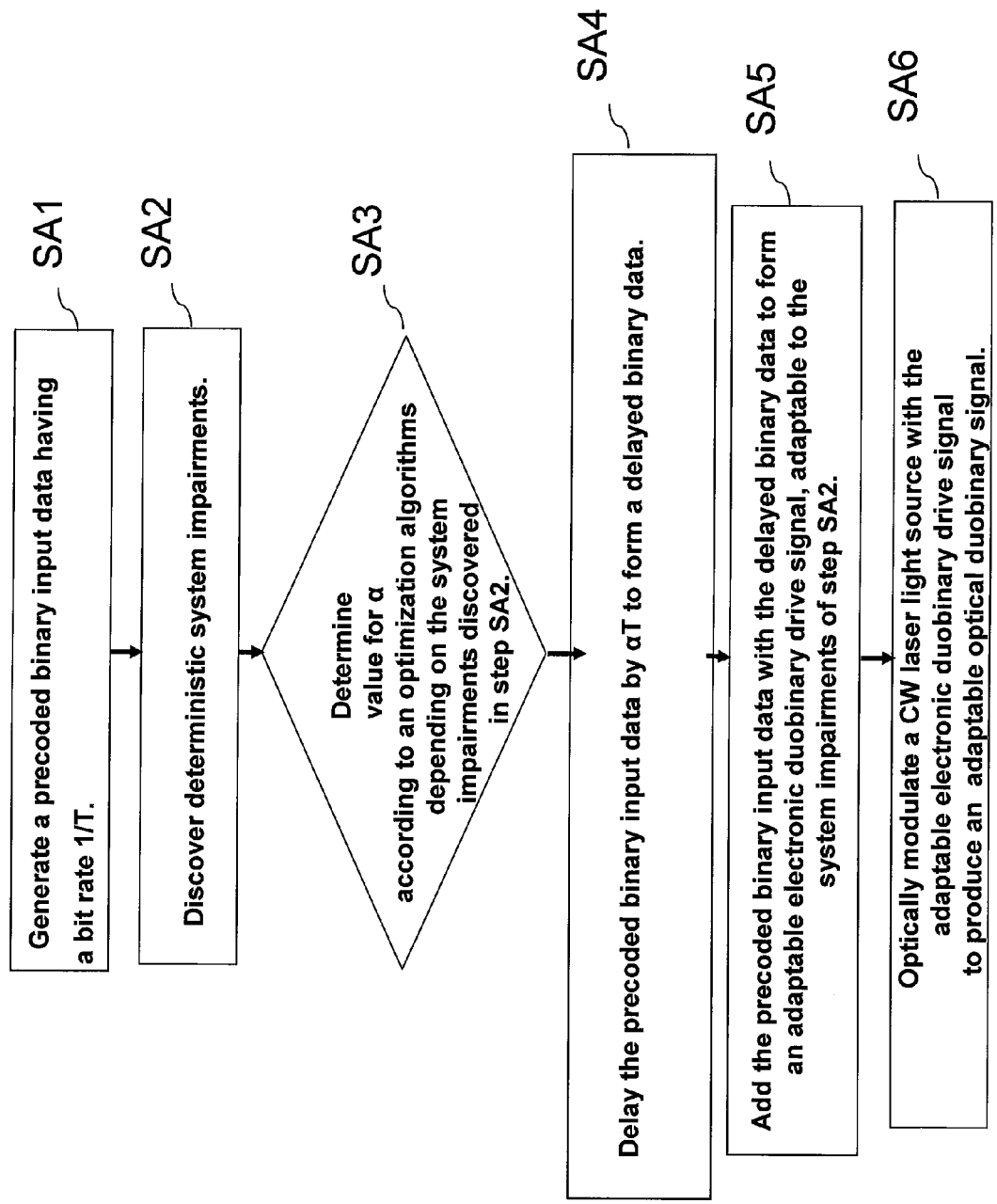
FIG. 10A is an exemplary flow chart of a method of generating an adaptable or programmably adaptable optical duobinary signal, according to an aspect of the invention.

According to an aspect of this invention, an exemplary method of producing the adaptable or programmable optical duobinary signal is shown by a flow chart in FIG. 10A. As shown, the method includes the following steps:

(SA1) Generate precoded binary input data DATA having data bit rate of 1/T;

(SA2) Discover deterministic system impairments;

(SA3) Determine the value of an adaptation parameter $\alpha$ according to an optimization algorithm dependent on the deterministic system impairments discovered in step SA2;

(SA4) Adaptively delay the precoded binary input data by a period $\alpha T$ to form a delayed binary data;

(SA5) Add the precoded binary input data with the delayed binary data to form an adaptable electronic duobinary drive signal, adaptable to the system impairments of step SA2; and (SA6) Optically modulate a CW laser light source with the adaptable E-DB drive signal to produce an adaptable O-DB signal.

Figure 10B:
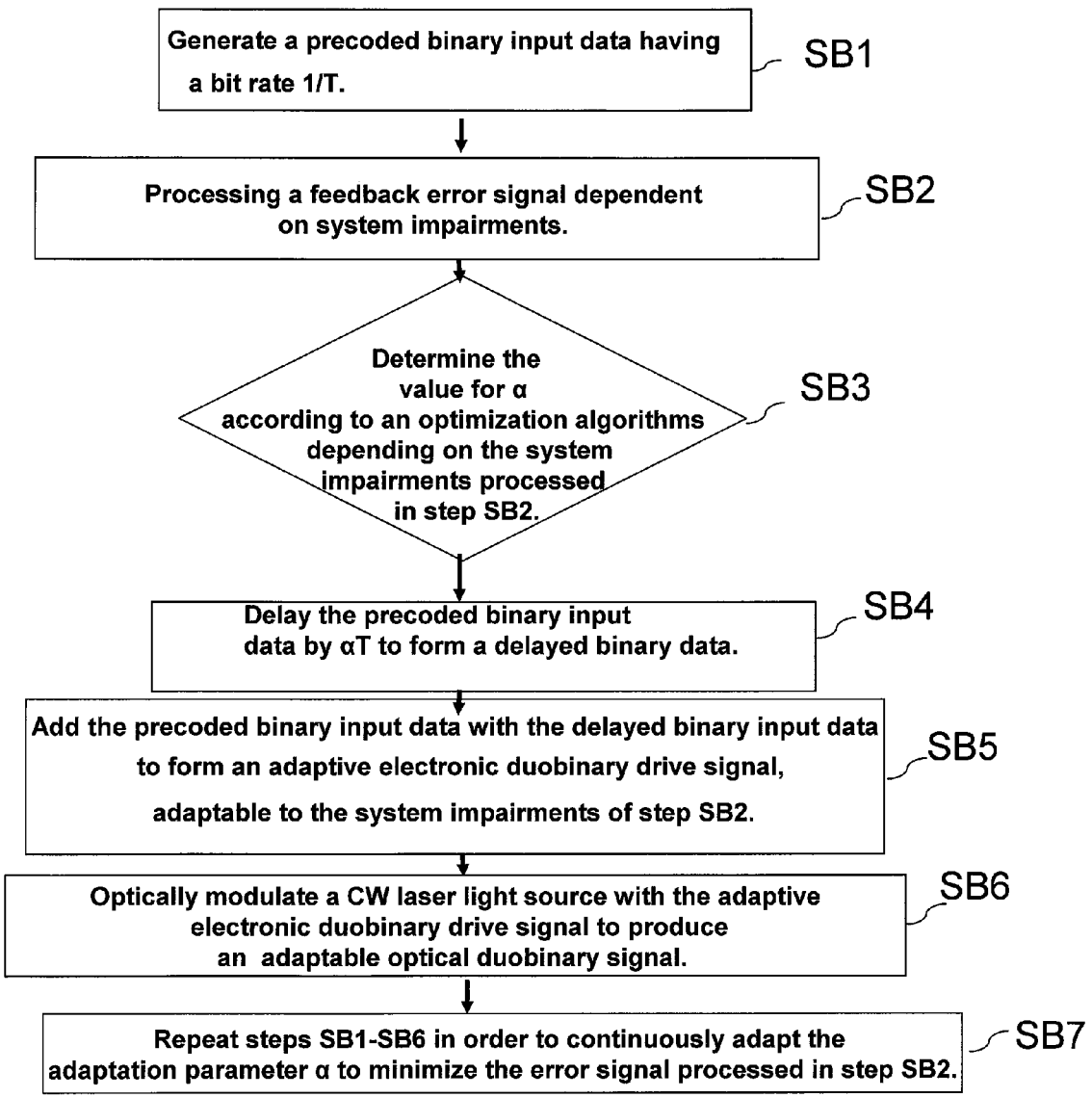
FIG. 10B is an exemplary flow chart of a method of generating a dynamically adaptable optical duobinary signal, according to an aspect of the invention.

According to an additional aspect of this invention, an exemplary method of producing the dynamically adaptable optical duobinary signal, dynamically adaptable O-DB, is shown by a flow chart in FIG. 10B. As shown, the method includes the following steps:

(SB1) Generate a precoded binary input data DATA having data bit rate of 1/T;

(SB2) Processing a feedback error signal dependent on system impairments. The feedback error signal is typically the BER measured at receiver from FEC overhead;

(SB3) Determine the value of an adaptation parameter $\alpha$ according to an optimization algorithm dependent on the system impairments processed in step SB2;

(SB4) Delay the precoded binary input data B by a period $\alpha T$ to form a delayed binary data;

(SB5) Add the precoded binary input data with the delayed binary data to form an adaptable electronic duobinary drive signal, adaptable to the system impairments of step SB2;

(SB6) Optically modulate a CW laser light source with the adaptable E-DB drive signal to produce an adaptable O-DB signal, and (SB7) Repeating steps SB1-SB6 in order to continuously adapt the adaptation parameter $\alpha$ to minimize the error signal processed in step SB2.

Thus, despite the prior art criticism of implementing the duobinary generating filter in the electronic domain, according to an aspect of the present invention, an adaptable, programmably adaptable or a dynamically adaptable electronic duobinary filters are provided for an adaptable electronic duobinary transmitter and adaptable optical duobinary transmitter. This inventive filter substantially compensates for signal distortions due to either deterministic or dynamically varying system impairments. In addition, this inventive electronic filter, according to some embodiments of this invention, will enable production of cost effective, efficient, adaptable optical duobinary transmission systems. Further, this inventive filter, according to other aspects of this invention, is more easily implemented, as compared to prior art systems utilizing optical delay interferometers, and is therefore more desirable for multi-channel PIC based optical duobinary transmitters.

The foregoing description of the embodiments and aspects of the invention have been presented for purposes of illustration and description and not intended to be exhaustive or limiting. Many modifications and variations are possible in light of the above teaching, such that the present invention may be embodied in other forms without departing from its spirit or essential characteristics. It is intended that the scope of this invention be defined by the claims appended hereto, and by their range of equivalents which are embraced within their scope.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A duobinary transmission system, comprising:
   a duobinary filter including:
      a delay circuit configured to receive a binary data stream and delay said binary data stream by a period of time to provide a delayed binary data stream; and
      an adder circuit having first and second inputs, the first input configured to receive the binary data stream and the second input configured to receive the delayed binary data stream, the adder circuit being configured to add the binary data stream and the delayed binary data stream to provide a duobinary signal; and
   a feedback circuit configured to generate a control signal from a feedback signal associated with the duobinary signal, and provide the control signal to the delay circuit, the period of time being determined based on the control signal.

2. The duobinary transmission system of claim 1, wherein the feedback signal is indicative of a bit error rate associated with the duobinary signal.

3. The duobinary transmission system of claim 1, wherein one or more system impairments associated with the duobinary transmission system are reduced in response to the control signal.

4. The duobinary transmission system of claim 1, wherein the feedback circuit further comprises a duobinary receiver configured to receive a portion of the duobinary signal and generate the feedback signal from the portion of the duobinary signal.

5. The duobinary transmission system of claim 1, further comprising a precoder for receiving a binary input signal, the precoder configured to generate the binary data stream in response to said binary input signal.

6. The duobinary transmission system of claim 5, wherein one or more system impairments associated with the duobinary transmission system are reduced in resosne to the control signal.

7. The duobinary transmission system of claim 1, wherein the feedback circuit further comprises a computer configured to process the feedback signal and calculate the control signal in response to said processed feedback signal.

8. The duobinary transmission system of claim 1 further comprising:
   a laser providing light having a wavelength, and a modulator configured to modulate said light in accordance with the duobinary signal and provide a modulated duobinary signal at an output of the modulator.

9. The duobinary transmission system of claim 8, wherein one or more system impairments associated with the duobinary transmission system are reduced in response to the control signal.

10. The duobinary transmission system of claim 8, wherein the modulator is a Mach-Zehnder Modulator (MZM).

11. The duobinary transmission system of claim 10, wherein the binary data stream is a second binary data stream, the duobinary transmission system further comprising an amplifier configured to receive a first binary data stream and amplify the first binary data stream to generate an amplified binary data stream, the second data stream being the amplified binary data stream.

12. The duobinary transmission system of claim 11, wherein the duobinary signal is a first duobinary signal and the amplifier is a first amplifier, the duobinary transmission system further comprising a second amplifier configured to receive the first duobinary signal and provide an amplified duobinary signal to the MZM, the amplified duobinary signal being a second duobinary signal.

13. The duobinary transmission system of claim 10, further comprising an amplifier configured to receive the duobinary signal and provide an amplified duobinary signal to the MZM.

14. The duobinary generator of claim 10, wherein the duobinary filter is a first duobinary filter and the duobinary signal is a first duobinary signal, and the MZM is a dual-drive MZM, the duobinary transmission system further comprising a second duobinary filter which provides a second duobinary signal, the dual-drive MZM configured to receive each of the first and second duobinary signals and provide the optical duobinary signal in response to the first and second duobinary signals.

15. The duobinary generator of claim 8 wherein the laser is a DFB laser.

16. The duobinary generator of claim 8, wherein the laser and the modulator are provided in a single photonic integrated circuit.

17. An optical duobinary transmitter, comprising:
a precoder configured to receive electronic binary data having and output differentially precoded binary data;
an amplifier configured to receive said differentially precoded binary data and output first and second amplified precoded binary signals, the second amplified precoded binary signal being the complement of the first amplified precoded binary signal;
first and second electronic duobinary filters for receiving said first and second amplified precoded binary signals, respectively, each of said first and second electronic duobinary filters having:
  a delay element configured to receive a respective one of said first and second amplified precoded binary signals and output a respective one of first and second delayed binary signals which is delayed by a period of time; and
  an adder for adding the respective one of the first and second amplified precoded binary signals with the respective one of the first and second delayed binary signals, such that said first and second electronic filters output first and second electronic duobinary signals, respectively;
a laser source for producing light at a wavelength;
a dual-drive Mach-Zehnder Modulator configured to modulate said light according to said first and second electronic duobinary signals and output an optical duobinary signal; and
a feedback circuit configured to generate first and second control signals from a feedback signal associated with the modulated optical duobinary signal and provide said first control signals to the delay element of said first electronic duobinary filter and said second control signal to the delay element of said second electronic duobinary filter, the period of time associated with the delay element of the first electronic duobinary filter being based on the first control signal and the period of time associated with the delay element of the second duobinary filter being based on the second control signal.

18. An optical communication system, comprising:
a plurality of duobinary transmitters, each configured to receive a corresponding one of a plurality of binary input signals and provide a corresponding one of a plurality of modulated optical duobinary signals, each of the plurality of duobinary transmitters including:
  a precoder for receiving a corresponding one of the plurality of binary input signals, the precoder configured to generate a precoded binary input signal;
  a duobinary filter including:
    a delay circuit configured to receive the precoded binary data stream by a period of time to provide a delayed binary data stream; and
    an adder circuit having first and second inputs, the first input configured to receive the precoded binary input signal and the second input configured to receive the delayed binary data signal, the adder circuit configured to combine the precoded binary input signal and the delayed binary data signal into a duobinary signal;
  a laser configured to provide light at a respective one of a plurality of wavelengths; and
  a modulator configured to receive said light and modulate said light according to the duobinary signal to generate a corresponding one of the plurality of modulated optical duobinary signals;
an optical multiplexer configured to receive the plurality of modulated optical duobinary signals and combine the plurality of modulated optical duobinary signals into a multiplexed optical duobinary signal;
a fiber-optic transmission line configured to transport the multiplexed optical duobinary signal;
an optical demultiplexer configured to receive the multiplexed optical duobinary signal from the fiber-optic transmission line and demultiplex the multiplexed optical duobinary signal into the plurality of modulated optical duobinary signals;
a plurality of receivers, each of the plurality of receivers configured to receive and demodulate a respective one of the plurality of modulated optical duobinary signals into a corresponding one of the plurality of binary data streams; and
a feedback circuit configured to generate a corresponding one of a plurality of control signals, each of the plurality of control signals being generated from a corresponding one of a plurality of feedback signals, each of the plurality of feedback signals associated with a respective one of the plurality of modulated optical duobinary signals, the period of time associated with the delay circuit of each duobinary filter of each of the plurality of duobinary transmitters being indicative of a respective one of the plurality of control signals.

19. The optical communication system of claim 18, wherein the feedback circuit includes a computer configured to generate the plurality of feedback signals, each of the plurality of feedback signals being associated with a bite-error rate of a corresponding one of the plurality of modulated optical duobinary signals.

20. The optical communication system of claim 18, wherein the laser and the modulator of each duobinary filter of each of the plurality of transmitters, and the optical multiplexer are provided in a single photonic integrated circuit.

21. A method of producing an optical duobinary signal to be transmitted within an optical communication system, comprising steps of:
(1) generating a precoded binary input data having a data bit rate of 1/T;
(2) determining system impairments associated with the optical communication system, and generating a feedback signal in response to the system impairments;
(3) determining the value of an adaptation parameter, α, according to an optimization algorithm dependent on said system impairments;
(4) delaying the precoded binary input data by a period of time to provide a delayed precoded input binary data;
(5) adding the precoded binary input data with the delayed precoded binary input data to provide a duobinary signal;
(6) modulating light of a laser with the duobinary drive signal to produce a modulated optical duobinary signal; and
(7) repeating steps (1)-(6) to continuously determine the adaptation parameter, α, to minimize the generated feedback signal.

22. A duobinary transmission system, comprising:
a duobinary filter including:
a delay circuit configured to receive a binary data stream and delay said binary data stream by a period of time to provide a delayed binary data stream; and
an adder circuit having first and second inputs, the first input configured to receive the binary data stream and the second input configured to receive the delayed binary data stream, the adder circuit configured to add the binary data stream and the delayed binary data stream to provide a duobinary signal; and
a processor circuit configured to generate a control signal and provide the control signal to the delay circuit, the period of time determined based on the control signal.

23. The duobinary transmission system of claim 22, wherein the processor circuit is configured to receive a feedback signal associated with the duo binary signal, the control signal being determined based on the feedback signal.

24. The duobinary transmission system of claim 23, wherein the feedback signal is a bit error rate associated with the duo binary signal.

25. The duobinary transmission system of claim 22, wherein one or more system impairments associated with the duobinary transmission system are reduced in response to the control signal.

26. The duobinary transmission system of claim 22, wherein the feedback circuit further comprises a duobinary receiver configured to receive a portion of the duobinary signal and generate the feedback signal from the portion of the duo binary signal.

27. The duobinary transmission system of claim 22, further comprising a precoder for receiving a binary input signal, the precoder configured to generate the binary data stream in response to said binary input signal.

28. The duobinary transmission system of claim 22, further comprising:
a laser supplying light having a wavelength, and
a modulator configured to modulate said light in accordance with the duobinary signal and provide an optical duo binary signal at an output of the modulator.

29. The duobinary transmission system of claim 22, wherein the processor circuit is a computer.

\* \* \* \* \*